(12) United States Patent
Antchak et al.

(10) Patent No.: US 9,989,129 B2
(45) Date of Patent: Jun. 5, 2018

(54) INTELLIGENT BELT DRIVE SYSTEM AND METHOD

(71) Applicant: LITENS AUTOMOTIVE PARTNERSHIP, Woodbridge (CA)

(72) Inventors: John R. Antchak, Aurora (CA); Zbyslaw Staniewicz, Mississauga (CA); Andrew M. Boyes, Aurora (CA)

(73) Assignee: LITENS AUTOMOTIVE PARTNERSHIP, Woodbridge (CA)

( * ) Notice: Subject to any disclaimer, the term of this patent is extended or adjusted under 35 U.S.C. 154(b) by 27 days.

(21) Appl. No.: 15/130,391

(22) Filed: Apr. 15, 2016

(65) Prior Publication Data

US 2016/0230855 A1 Aug. 11, 2016

Related U.S. Application Data

(62) Division of application No. 14/117,580, filed as application No. PCT/CA2012/000466 on May 14, 2012, now Pat. No. 9,334,932.

(60) Provisional application No. 61/639,859, filed on Apr. 28, 2012, provisional application No. 61/486,189, filed on May 13, 2011.

(51) Int. Cl.
*F16H 7/08* (2006.01)
*F16H 7/22* (2006.01)
*F16H 7/12* (2006.01)

(52) U.S. Cl.
CPC ............ *F16H 7/1263* (2013.01); *F16H 7/12* (2013.01); *F16H 7/1281* (2013.01); *F16H 2007/081* (2013.01); *F16H 2007/0806* (2013.01); *F16H 2007/0823* (2013.01); *F16H 2007/0842* (2013.01); *F16H 2007/0861* (2013.01); *F16H 2007/0885* (2013.01); *F16H 2007/0887* (2013.01); *F16H 2007/0891* (2013.01); *F16H 2007/0893* (2013.01)

(58) Field of Classification Search
CPC .......... F16H 7/1281; F16H 2007/0806; F16H 2007/0885; F16H 2007/0823; F02B 67/06
USPC ....................................................... 474/101
See application file for complete search history.

(56) References Cited

U.S. PATENT DOCUMENTS

| | | | |
|---|---|---|---|
| 3,954,016 A | | 5/1976 | Sarosy et al. |
| 4,077,272 A | * | 3/1978 | Busso .................. F16H 7/1281 474/110 |
| 4,131,306 A | | 11/1978 | Sokoly et al. |
| 4,263,578 A | | 4/1981 | Fukuhara et al. |
| 4,355,991 A | * | 10/1982 | Kraft ...................... F02B 67/06 474/110 |

(Continued)

FOREIGN PATENT DOCUMENTS

| CA | 2469497 | 6/2003 |
|---|---|---|
| CA | 2508352 | 7/2004 |

(Continued)

OTHER PUBLICATIONS

Bosch Handbook—Alternator Design Theory, 2011.

(Continued)

*Primary Examiner* — Henry Y Liu
(74) *Attorney, Agent, or Firm* — Millman IP Inc.

(57) ABSTRACT

In one aspect the invention relates to a tensioner that is capable of precognitively anticipating when it is desirable to increase the tension in a belt or other endless drive element so as to prevent belt slip prior to events that would raise the risk of it.

9 Claims, 9 Drawing Sheets

(56) References Cited

U.S. PATENT DOCUMENTS

| | | | |
|---|---|---|---|
| 4,406,550 A | 9/1983 | Gray | |
| 4,473,362 A | 9/1984 | Thomey et al. | |
| 4,478,595 A * | 10/1984 | Hayakawa | F02B 77/081 474/109 |
| 4,533,341 A * | 8/1985 | Yokota | F16H 7/0848 474/109 |
| 4,573,952 A | 3/1986 | Schulze | |
| 4,573,957 A | 3/1986 | Billberg | |
| 4,575,367 A | 3/1986 | Karmel | |
| 4,648,357 A | 3/1987 | Hayashi | |
| 4,674,781 A | 5/1987 | Reece et al. | |
| 4,702,727 A | 10/1987 | Dahm | |
| 4,728,260 A | 3/1988 | Ishii | |
| 4,731,044 A | 3/1988 | Mott | |
| 4,758,208 A * | 7/1988 | Bartos | F16H 7/1281 474/111 |
| 4,802,883 A | 2/1989 | Tominaga et al. | |
| 4,850,466 A | 7/1989 | Rogakos et al. | |
| 4,878,461 A | 11/1989 | Sapienza, IV et al. | |
| 4,883,446 A | 11/1989 | Mitchell | |
| 4,885,954 A | 12/1989 | Wanlass | |
| 4,893,704 A | 1/1990 | Fry et al. | |
| 4,959,042 A * | 9/1990 | Tanaka | F02B 67/06 474/134 |
| 4,977,743 A | 12/1990 | Aihara et al. | |
| 5,011,458 A | 4/1991 | Kumm | |
| 5,159,904 A * | 11/1992 | Ingold | F01L 1/348 123/90.15 |
| 5,338,076 A | 8/1994 | Tanaka | |
| 5,439,420 A * | 8/1995 | Meckstroth | F02B 67/06 474/133 |
| 5,482,406 A | 1/1996 | Arit | |
| 5,634,676 A | 6/1997 | Feder | |
| 5,733,214 A * | 3/1998 | Shiki | F01L 1/02 474/110 |
| 5,752,891 A * | 5/1998 | Meckstroth | F02B 67/06 474/110 |
| 5,862,903 A | 1/1999 | Gruden et al. | |
| 5,873,799 A | 2/1999 | Meckstroth | |
| 5,890,519 A * | 4/1999 | De Jager | D03D 49/04 139/110 |
| 5,983,739 A | 11/1999 | Feder | |
| 6,067,826 A | 5/2000 | Holloway et al. | |
| 6,216,547 B1 | 4/2001 | Lehtovaara | |
| 6,264,478 B1 | 7/2001 | Ayukawa | |
| 6,264,578 B1 | 7/2001 | Ayukawa | |
| 6,374,608 B1 | 4/2002 | Corris et al. | |
| 6,375,588 B1 | 4/2002 | Frankowski et al. | |
| 6,422,962 B1 | 7/2002 | Lehtovaara et al. | |
| 6,478,701 B1 | 11/2002 | Yasuhara et al. | |
| 6,484,593 B2 | 11/2002 | Lehtovaara | |
| 6,547,692 B1 | 4/2003 | Ries-Mueller et al. | |
| 6,572,501 B2 * | 6/2003 | Winklhofer | F01L 1/02 474/102 |
| 6,609,985 B2 | 8/2003 | Todd et al. | |
| 6,609,988 B1 * | 8/2003 | Liu | F16H 7/1218 474/133 |
| 6,629,512 B2 | 10/2003 | Iwatant et al. | |
| 6,666,784 B1 | 12/2003 | Iwamoto et al. | |
| 6,668,954 B2 * | 12/2003 | Field | B60K 6/40 180/65.23 |
| 6,746,352 B1 * | 6/2004 | Poiret | F01L 1/02 474/101 |
| 6,758,172 B2 | 7/2004 | Morgan et al. | |
| 6,789,035 B1 * | 9/2004 | Hashimoto | G01L 5/042 702/105 |
| 6,821,223 B2 * | 11/2004 | Henry | F01L 1/34 474/109 |
| 6,834,228 B2 | 12/2004 | Serkh et al. | |
| 6,849,011 B2 * | 2/2005 | Calfa | F16H 7/1281 474/101 |
| 6,855,141 B2 | 2/2005 | Lovewell | |
| 6,861,765 B2 * | 3/2005 | Taniguchi | F02B 63/04 192/45.017 |
| 6,913,068 B2 | 7/2005 | Togawa et al. | |
| 6,953,407 B2 * | 10/2005 | Kitamura | F02B 67/06 474/109 |
| 6,955,141 B2 | 10/2005 | Santanam et al. | |
| 6,991,570 B2 * | 1/2006 | Serkh | F16H 7/1218 474/113 |
| 7,059,984 B2 * | 6/2006 | Vaeth | D21F 7/005 474/101 |
| 7,081,059 B2 | 7/2006 | Iwamoto et al. | |
| 7,086,373 B2 | 8/2006 | Serkh | |
| 7,163,478 B2 | 1/2007 | Oliver et al. | |
| 7,188,021 B2 | 3/2007 | Spicer et al. | |
| 7,202,572 B2 * | 4/2007 | Blumel | H02M 7/797 290/37 R |
| 7,217,206 B2 * | 5/2007 | Stone | F01L 1/024 474/110 |
| 7,217,207 B1 | 5/2007 | Hallen | |
| 7,226,377 B2 | 6/2007 | Kraus | |
| 7,479,078 B2 * | 1/2009 | Joslyn | F16H 7/1281 474/117 |
| 7,591,357 B2 | 9/2009 | Antchak et al. | |
| 7,618,337 B2 | 11/2009 | Jansen et al. | |
| 7,624,852 B2 | 12/2009 | Mevissen et al. | |
| 7,699,732 B2 | 4/2010 | Message et al. | |
| 7,771,302 B2 | 8/2010 | Pendergrass | |
| 8,069,737 B2 * | 12/2011 | Hanoun | G01L 5/102 73/862.474 |
| 8,132,549 B2 * | 3/2012 | Dell | F01L 1/02 123/90.15 |
| 8,166,945 B2 | 5/2012 | Spicer et al. | |
| 8,845,487 B2 * | 9/2014 | Mueller | F02B 67/06 477/44 |
| 9,297,445 B2 * | 3/2016 | Kees | F02N 11/006 |
| 9,599,199 B2 * | 3/2017 | Graves | F02B 67/06 |
| 2002/0039942 A1 | 4/2002 | Liu | |
| 2002/0039945 A1 | 4/2002 | Ali et al. | |
| 2002/0052260 A1 * | 5/2002 | Kitamura | F02B 67/06 474/135 |
| 2002/0128099 A1 | 9/2002 | Winklhofer | |
| 2003/0083803 A1 * | 5/2003 | Serkh | F02B 67/06 701/115 |
| 2003/0199350 A1 * | 10/2003 | Henry | F01L 1/34 474/138 |
| 2004/0020697 A1 * | 2/2004 | Field | B60K 6/40 180/65.23 |
| 2005/0029991 A1 | 2/2005 | Albertson | |
| 2005/0087990 A1 * | 4/2005 | Henry | F01L 1/34 290/38 R |
| 2005/0187052 A1 | 8/2005 | Yokoyama | |
| 2005/0192142 A1 * | 9/2005 | Stone | F01L 1/024 474/101 |
| 2005/0192144 A1 * | 9/2005 | Yokoyama | F16H 7/1281 474/117 |
| 2005/0261094 A1 | 11/2005 | Foster et al. | |
| 2005/0282668 A1 * | 12/2005 | Ali | F16H 7/1218 474/101 |
| 2006/0178240 A1 * | 8/2006 | Hansel | F01L 1/02 474/135 |
| 2006/0240922 A1 * | 10/2006 | Pendergrass | F16H 7/1281 474/102 |
| 2006/0249118 A1 * | 11/2006 | Serkh | F01L 1/024 123/198 R |
| 2006/0276284 A1 * | 12/2006 | Lancaster | F02B 67/06 474/110 |
| 2007/0012493 A1 * | 1/2007 | Jones | B60L 11/12 180/65.22 |
| 2007/0080037 A1 * | 4/2007 | Larry | F02B 67/06 192/21.5 |
| 2007/0142145 A1 | 6/2007 | Namuduri | |
| 2007/0261648 A1 | 11/2007 | Reckels et al. | |
| 2008/0220919 A1 | 9/2008 | Antchak et al. | |
| 2009/0023546 A1 * | 1/2009 | Licata | F01P 5/12 476/67 |
| 2009/0156340 A1 * | 6/2009 | Seo | F16H 7/1281 474/113 |

(56) References Cited

U.S. PATENT DOCUMENTS

| | | | |
|---|---|---|---|
| 2009/0186726 A1* | 7/2009 | Van Maanen | B60K 6/485 474/110 |
| 2009/0195203 A1* | 8/2009 | Yurgil | B60K 6/485 318/452 |
| 2009/0291790 A1 | 11/2009 | Harada et al. | |
| 2009/0298646 A1 | 12/2009 | Parsons | |
| 2010/0065001 A1* | 3/2010 | Spicer | F02N 15/022 123/179.28 |
| 2010/0076634 A1* | 3/2010 | Brigham | B60K 6/485 701/22 |
| 2010/0102783 A1 | 4/2010 | McDonald et al. | |
| 2010/0137083 A1 | 6/2010 | Carlson | |
| 2011/0048390 A1 | 3/2011 | Washburn | |
| 2011/0112742 A1 | 5/2011 | Losano et al. | |
| 2011/0118077 A1 | 5/2011 | Kawasaki et al. | |
| 2011/0312454 A1 | 12/2011 | Comsa et al. | |
| 2012/0065009 A1* | 3/2012 | Mueller | F02B 67/06 474/101 |
| 2012/0158226 A1* | 6/2012 | Prucka | B60K 6/485 701/22 |
| 2012/0197473 A1 | 8/2012 | Kshatriya | |
| 2012/0318589 A1* | 12/2012 | Staley | F16H 7/1281 180/65.21 |
| 2013/0172137 A1* | 7/2013 | Antchak | B60K 25/02 474/133 |
| 2013/0288835 A1* | 10/2013 | Hauck | F02B 67/06 474/87 |
| 2014/0076683 A1* | 3/2014 | Williams | B60K 25/02 192/41 S |
| 2014/0130635 A1* | 5/2014 | Kees | F02N 11/006 74/7 R |
| 2014/0315673 A1* | 10/2014 | Zacker | F16H 7/1218 474/135 |
| 2015/0144099 A1* | 5/2015 | Straker | F02N 11/04 123/339.14 |
| 2016/0146312 A1* | 5/2016 | Pfeifer | F16H 7/08 474/135 |

FOREIGN PATENT DOCUMENTS

| | | |
|---|---|---|
| CN | 1726361 | 1/2006 |
| CN | 101497339 | 9/2012 |
| DE | 2802042 | 7/1979 |
| DE | 3836933 | 5/1990 |
| DE | 3904017 | 8/1990 |
| DE | 3616561 | 10/1990 |
| DE | 4114716 | 11/1992 |
| DE | 3880982 | 5/1993 |
| DE | 69018083 | 10/1995 |
| DE | 19604182 | 9/1996 |
| DE | 19634619 | 3/1997 |
| DE | 69218428 | 10/1997 |
| DE | 19701809 | 9/1998 |
| DE | 19822632 | 11/1999 |
| DE | 19959096 | 12/1999 |
| DE | 19881945 | 1/2000 |
| DE | 19919594 | 11/2000 |
| DE | 10049505 | 5/2001 |
| DE | 10225268 | 12/2003 |
| DE | 102005008580 | 9/2005 |
| DE | 102004055428 | 5/2006 |
| DE | 102006019877 A1 | 10/2007 |
| DE | 102009045880 | 11/2011 |
| DE | 102011084680 B3 | 11/2012 |
| DE | 102013203957 B3 | 2/2014 |
| DE | 102012019038 A1 | 3/2014 |
| DE | 102013206010 B3 | 8/2014 |
| DE | 102103206010 | 8/2014 |
| DE | 102013215639 A1 | 2/2015 |
| EP | 228199 | 7/1987 |
| EP | 337894 | 10/1989 |
| EP | 676537 | 3/1995 |
| EP | 676537 B1 | 12/1998 |
| EP | 1564440 | 10/2002 |
| EP | 1438521 | 7/2004 |
| EP | 1511925 | 3/2005 |
| EP | 1552188 | 7/2005 |
| EP | 1573230 | 7/2007 |
| EP | 1564440 | 7/2008 |
| FR | 2899685 | 10/2007 |
| FR | 2877782 B1 | 7/2011 |
| GB | 2158271 | 11/1985 |
| GB | 2199917 | 10/1987 |
| JP | 51-003013 A | 1/1976 |
| JP | 54160908 Y1 | 12/1979 |
| JP | 56028339 A | 3/1981 |
| JP | 57105525 A | 7/1982 |
| JP | 57-161344 A | 10/1982 |
| JP | S57-161344 A | 10/1982 |
| JP | 59-107357 U | 7/1984 |
| JP | 1985007446 U | 1/1985 |
| JP | 60-172048 U | 11/1985 |
| JP | 60-019850 A | 8/1986 |
| JP | 61183049 A | 8/1986 |
| JP | 62-10522 Y2 | 3/1987 |
| JP | 1987010522 Y | 3/1987 |
| JP | 62088861 A | 4/1987 |
| JP | 63-97747 U | 6/1988 |
| JP | 1288656 | 11/1989 |
| JP | 1-310125 | 12/1989 |
| JP | 2-118252 A | 5/1990 |
| JP | 1990118252 A | 5/1990 |
| JP | 2-225234 A | 9/1990 |
| JP | 1990225234 A | 9/1990 |
| JP | 1991010041 | 1/1991 |
| JP | 1991010041 U | 1/1991 |
| JP | 3050329 | 3/1991 |
| JP | 3-91559 A | 9/1991 |
| JP | 1991091559 U | 9/1991 |
| JP | 4252823 | 8/1992 |
| JP | 4252823A U | 9/1992 |
| JP | 4285350 | 10/1992 |
| JP | 5288261 | 11/1993 |
| JP | 02-085061 A | 8/1996 |
| JP | 08-210447 A | 8/1996 |
| JP | H02-085061 A | 8/1996 |
| JP | H08-210447 A | 8/1996 |
| JP | 07-054561 A | 9/1996 |
| JP | 8243283 A | 9/1996 |
| JP | 1997041985 | 2/1997 |
| JP | 09-257109 A | 9/1997 |
| JP | 1997184428 | 9/1997 |
| JP | H09-257109 A | 9/1997 |
| JP | 08-326853 | 6/1998 |
| JP | 10150742 | 6/1998 |
| JP | 10168025 A | 6/1998 |
| JP | 1998299847 A | 11/1998 |
| JP | 11-190222 A | 1/2001 |
| JP | 2001020698 A | 1/2001 |
| JP | 2001-059555 | 3/2001 |
| JP | 2001059555 A2 | 3/2001 |
| JP | 2001289291 A | 10/2001 |
| JP | 2002138847 A | 5/2002 |
| JP | 2004204954 A | 12/2002 |
| JP | 2004036820 A | 2/2004 |
| JP | 2004052964 A | 2/2004 |
| JP | 2005265039 A | 9/2005 |
| JP | 2006118616 | 5/2006 |
| JP | 2006125448 A | 5/2006 |
| JP | 2006189073 A | 7/2006 |
| JP | 2006266311 A | 10/2006 |
| JP | 2007016932 A | 1/2007 |
| JP | 2007024293 A | 2/2007 |
| JP | 2007032678 A | 2/2007 |
| JP | 2007032711 A | 2/2007 |
| JP | 2009257412 A | 11/2009 |
| JP | 2009270642 A | 11/2009 |
| JP | 2010106873 A | 5/2010 |
| JP | 2010121667 A | 6/2010 |
| KR | 1019930000000 B1 | 12/1998 |
| KR | 1019930025186 B1 | 12/1998 |
| KR | 100305705 B1 | 8/2001 |

(56) References Cited

FOREIGN PATENT DOCUMENTS

| | | |
|---|---|---|
| KR | 20070025396 A | 3/2007 |
| WO | 00/00756 A1 | 1/2000 |
| WO | 756 A1 | 1/2000 |
| WO | 200057083 | 9/2000 |
| WO | 2003036133 | 8/2003 |
| WO | 2003104628 | 12/2003 |
| WO | 2003104673 | 12/2003 |
| WO | 2004033933 | 4/2004 |
| WO | 2004048808 | 6/2004 |
| WO | 2004061333 | 7/2004 |
| WO | 2004101974 | 11/2004 |
| WO | 2005010401 | 2/2005 |
| WO | 2005119089 | 12/2005 |
| WO | 2006045181 | 5/2006 |
| WO | 2006045186 | 5/2006 |
| WO | 2006053617 | 5/2006 |
| WO | 2007143830 | 12/2007 |
| WO | 2008113186 | 9/2008 |
| WO | 2009043424 | 4/2009 |
| WO | 2010011720 | 1/2010 |
| WO | 2010094127 | 8/2010 |
| WO | 2011047992 | 4/2011 |
| WO | 2011092206 | 8/2011 |
| WO | 2012031361 | 3/2012 |
| WO | 2012049030 A1 | 4/2012 |
| WO | 2012147510 A1 | 11/2012 |
| WO | 2014131414 | 9/2014 |

OTHER PUBLICATIONS

Industries Automotive, S.S. White Technologies, Inc., 2005-2008.
MTS Sensors North America C Series Sensors, MTS Sensors Corporation, Sensors Division, 2006-2014.
Office Action for EP12808149.4 dated May 15, 2017.
Product standard, S.S. White Technologies Inc., 2005-2008.
Solenoid Cable Kit, Trombetta Motion Technologies Brochure, date unknown.
SS White Flexible Rotary Drives Shafts Automotive Apps, S.S. White Technologies Inc., 2005-2008.
SS White Flexible Rotary Drives Shafts readyllex, S.S. White Technologies Inc., 2005-2008.
Tellurex PowerGen Z Max Modules, Tellurex Corporation, date unknown.
Trombetta Throttle Control Kit, Trombetta Electromagnetics, date unknown.
An Introduction to Thermoelectrics, Jun. 28, 2005, Tellurex Corporation.
Automotive Handbook (8th ed), Jul. 3, 2005, Robert Bosch GmbH (SAE International), pp. 987-994.
Choosing Ready-Flex Flexible Shafts with Casing, Jun. 30, 2005, S.S. White TechnologiesInc. (http://www.sswt.com/ready_flex_with_casing.htm).
ED-30 Incremental Linear Encoder, Durham Instruments.
An Introduction to Thermoelectrics, Tellurex Corporation.
Automotive Handbook (8th ed), Robert Bosch GmbH (SAE International), pp. 987-994.
Choosing Ready-Flex Flexible Shafts with Casing, S.S. White TechnologiesInc. (http://www.sswt.com/ready_flex_with_casing.htm).
ED-30 Incremental Linear Encoder, Unknown, Durham Instruments.
Elastogran—Cellasto (Brochure), Unknown, BASF.
Elastogran—Cellasto Tecnhical Information, Unknown, BASF.
Elastogran—Innovations in Cellasto (Brochure), BASF.
Extended Search Report for EP12808149 (EPO), dated Mar. 10, 2015.
First Search Report for CN201180043151, dated Mar. 18, 2015, SIPO.
Flexible Rotary Drive Shafts, S.S. White TechnologiesInc. (http://www.sswt.com/automotive.htm).
Honeywell AoB Sensor Catalog, Honeywell Automation India Ltd.
Honeywell SS 520 Magnetic Hall Position Sensor—Specification Sheet, May 9, 2011, Honeywell International Inc.
ICS100 In-Cylinder Sensors, Penny + Giles Controls Ltd.
MTS Temposonics Commercial Sensors, MTS Systems Corporation.
Office Action for U.S. Appl. No. 14/342,985, dated Jul. 1, 2015, USPTO.
PCT/CA2011/001032 Search Report, dated Jan. 24, 2012.
PCT/CA2012/000466 Search Report, dated Aug. 28, 2012.
PCT/CA2012/000818 Search Report, dated Dec. 14, 2012.
PCT/CA2013/000258 Search Report, dated Jul. 10, 2013.
PU Solutions Elastogran—Cellasto a cellular polyurethane elastomer (Brochure), BASF.
PU Solutions Elastogran—Cellasto Components Complete Industrial Products (Brochure), BASF.
SLH100 Hall Effect Contactless Linear Sensor, Penny + Giles Controls Ltd.
Solenoid Cable Kit Family, Trombetta Motion Technologies.
Tellurex Power Generation Z-Max Modules Specification Sheet, Tellurex Corporation.
Trombetta Throttle Control Kit—P613-K Series, Trombetta Motion Technologies.

* cited by examiner

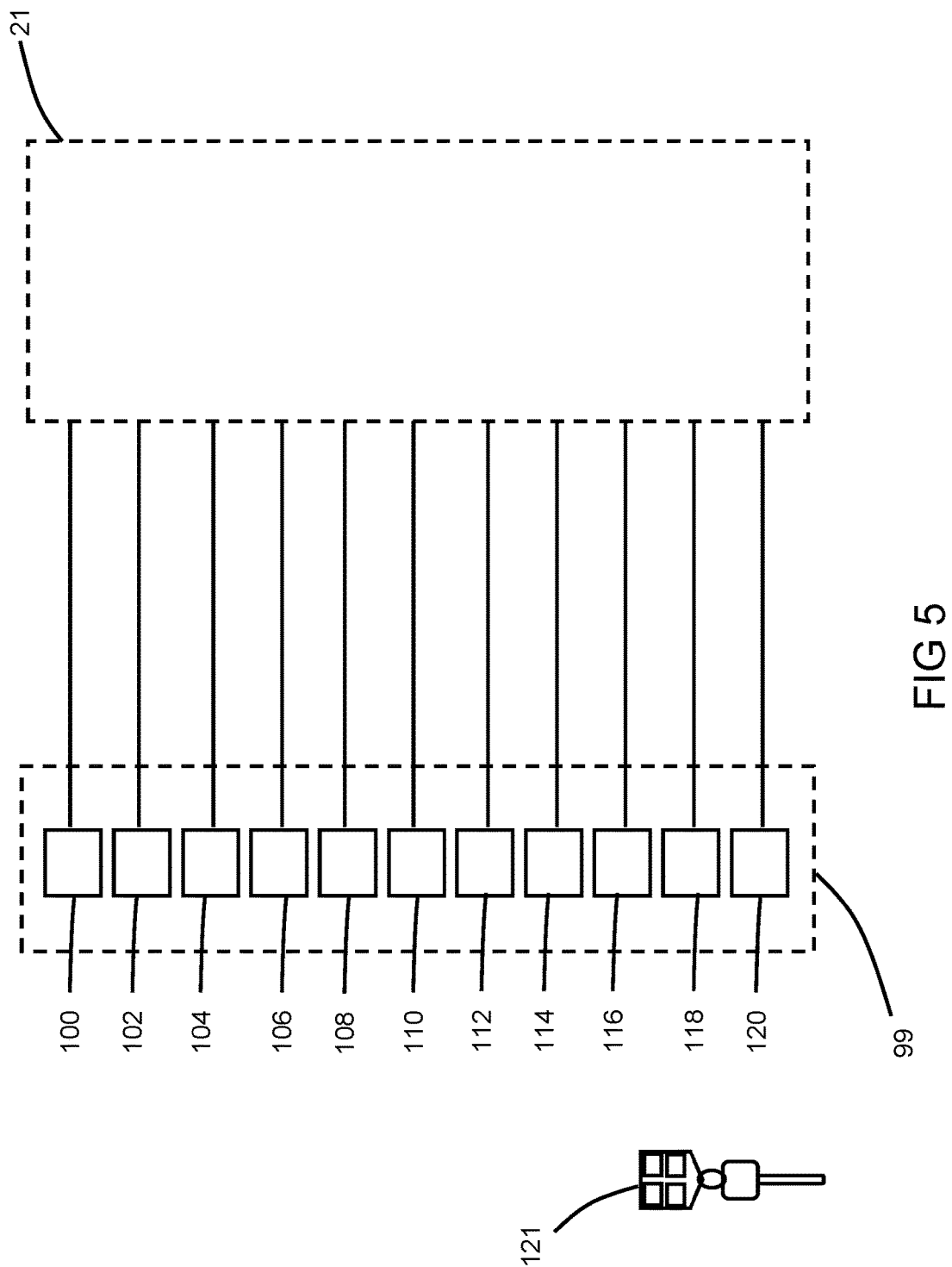

INTELLIGENT BELT DRIVE SYSTEM AND METHOD

CROSS-REFERENCE TO RELATED APPLICATIONS

This application is a divisional of U.S. patent application Ser. No. 14/117,580, filed on Nov. 10, 2014, which is a national stage application of PCT application PCT/CA2012/000466, filed on May 14, 2012, which claims the benefit of U.S. Provisional Patent Applications No. 61/486,189, filed May 13, 2011 and 61/639,859, filed Apr. 28, 2012, the disclosures of both of which are incorporated by reference as if fully set forth in detail herein.

FIELD OF THE INVENTION

The present invention relates to tensioners for tensioning engine driven elements such as timing belts, timing chains and accessory drive belts. In particular, the present invention is directed to belt tensioners that have the capability to adjust the belt tension in the belt.

BACKGROUND OF THE INVENTION

Tensioners for timing belts, timing chains and accessory drive belts are well known. Some tensioners are adjustable in terms of the amount of tension is generated in the belt during operation of the engine. Such tensioners react to certain sensed conditions that indicate a potential for, or occurrence of, belt slip. While such systems may reduce the frequency of belt slip, they are, by design, inherently permitting some belt slip to occur. In those systems that sense the actual occurrence of belt slip, belt slip has already necessarily occurred before the tensioner will increase belt tension. In systems where the conditions for belt slip are sensed, the conditions that create the potential for belt slip must already occur for them to be sensed by the tensioner, which inherently means therefore that belt slip can occur before the tensioner has reacted to increase belt tension.

While these systems have some advantage in terms of reducing the frequency of belt slip, they still permit some belt slip to occur, which may be detrimental to the belt, to certain accessories driven by the belt, and to the perception of low quality of the vehicle by a person hearing the chirp that can accompany belt slip.

Furthermore, the tension adjustment mechanisms employed by such tensioning systems may be expensive, and/or unreliable.

It would be beneficial to provide a tensioning system that has at least partially addresses one or more of these problems.

SUMMARY OF THE INVENTION

In one aspect, the invention relates to a tensioner that is capable of precognitively anticipating when it is desirable to increase the tension in a belt or other endless drive element so as to prevent belt slip prior to events that would raise the risk of it.

In another aspect, the invention relates to controlling a tensioner that has adjustable tension, in such a way as to avoid the tendency of the tensioner to cycle between high and low tension settings or to change the tension setting repeatedly in an effort to match the desired tension setting.

In another aspect, the invention relates to the use of one or more of the parameters described herein for the purpose of preventing belt slip. In another aspect, the invention relates to a tensioner control system verifying the detection of a condition that would call for a change in belt tension by checking inputs from other sensors and devices in the vehicle.

In another aspect, the invention relates a tensioner that can move an abutment member to sit at a selected position wherein it provides a movable load stop for the tensioner arm.

In another aspect the invention relates to the embodiments of tensioners shown and described herein.

BRIEF DESCRIPTION OF THE DRAWINGS

The foregoing and other aspects of the invention will be more readily appreciated having reference to the drawings, wherein:

FIG. 1c is also a front elevation view of an alternative tensioning system similar to the tensioning system shown in FIG. 1b, but with an actuator that can abut a tensioner arm of the tensioner, instead of being connected to the tensioner arm via a pin joint;

FIG. 4 is a side elevation view of a vehicle incorporating the tensioning system shown in FIG. 1a;

FIG. 5 is a schematic illustration of a plurality of sensors that send signals to the tensioner control system in FIG. 1a.

DETAILED DESCRIPTION OF THE INVENTION

Figure 1A:
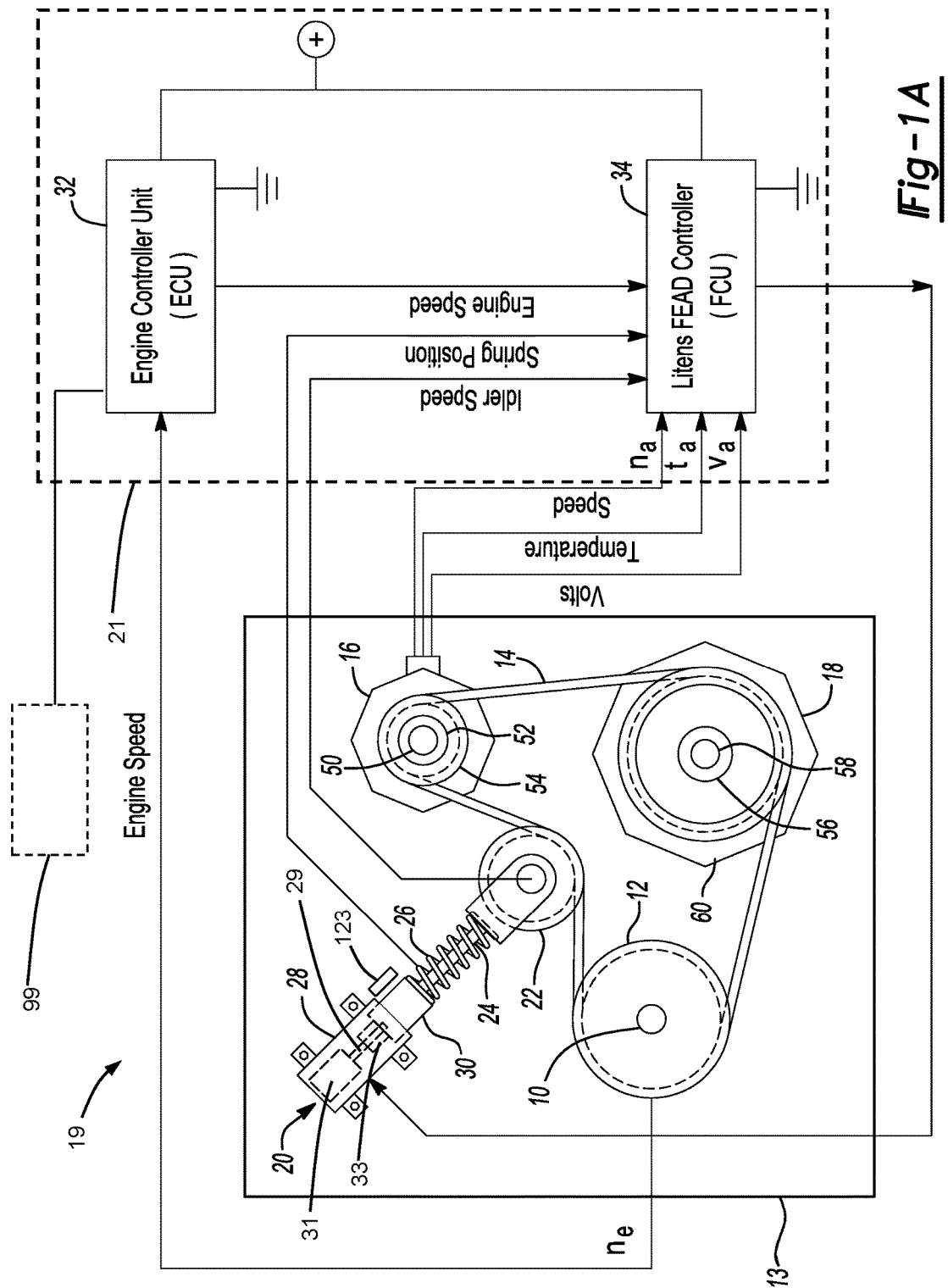
FIG. 1a is a front elevation view of a tensioning system for an engine in accordance with an embodiment of the present invention, that includes a linear, non-pivoting tensioner.
Figure 4:
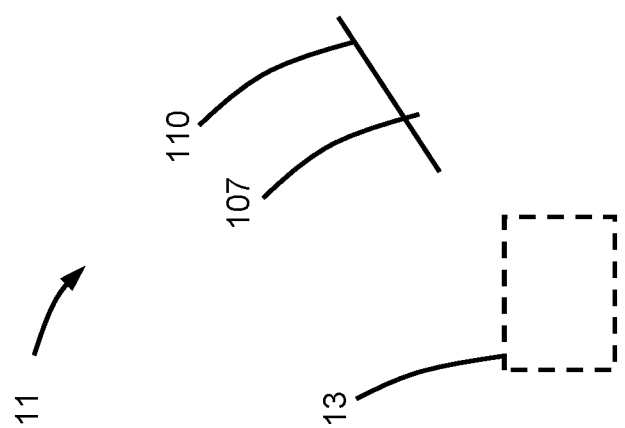

Reference is made to FIG. 1a, which shows a crankshaft 10 from an engine 13 from a vehicle 11 (shown in FIG. 4). The vehicle 11 may be any suitable vehicle, such as an automobile, a truck, a van, a minivan, a bus, a SUV, a military vehicle, or any other suitable vehicle. The crankshaft 10 has a crankshaft pulley 12 thereon. The crankshaft pulley 12 drives one or more vehicle accessories via a belt 14. The term 'belt' is used herein for convenience, however for the purpose of the claims and for the scope of this disclosure it will be understood that the belt 14 may alternatively be any other type of suitable endless drive member.

The accessories may include an alternator 16, an air conditioning compressor 18, a water pump (not shown), a power steering pump (not shown) and/or any other suitable accessory. Each of the driven accessories has a shaft, and a pulley that is connectable and disconnectable from the shaft via a clutch. The alternator shaft, clutch and pulley are shown at 54, 52 and 50 respectively. The air conditioning compressor shaft, clutch and pulley are shown at 56, 58 and 60 respectively. This permits each of the accessories to be shut off or disconnected via clutches when not needed even though the belt 14 itself is still being driven by the crankshaft 10.

Providing at least a certain amount of tension in the belt 14 is beneficial in that it reduces the amount of slip that can occur between the belt 14 and the driven accessories or even between the belt 14 and the crankshaft 10. However, providing an unnecessarily high tension in the belt 14 has many detrimental effects. For example, it causes more power from the engine 13 to be consumed in driving the accessories, leaving less power for use in driving the vehicle 11. As a result, to achieve a particular level of performance from the vehicle 11, a greater amount of fuel would be consumed than would be consumed if the power loss were smaller. Additionally, a high belt tension generates greater hub loads on the pulleys for the driven accessories, which necessitates the use of relatively larger shafts on the accessories, larger bearings to support the shafts, heavier brackets to hold the accessories in place, all of which add to the weight of the vehicle 11 and thereby negatively impact fuel economy for the vehicle 11.

A belt tensioning system 19 is shown, and includes a belt tensioner 20 and a control system 21. The belt tensioning system 19 keeps the belt 14 tensioned so as to reduce belt slip, and to keep the belt on the pulleys of the crankshaft 10 and belt driven accessories. Furthermore, the belt tensioning system 19 reduces the tendency of the belt 14 to undergo belt span flutter. The belt tensioner 20 includes a tensioner pulley 22 which engages the belt 14, a tensioner arm 24 which holds the tensioner pulley 22, a tensioner biasing member 26 for biasing the tensioner arm 24 towards a free arm stop position (the position the arm 24 would reach if it was not pressing into the belt 14), and a load stop position (the position the arm 24 would reach if the arm 24 were pushed all the way throughout its range of travel away from the free arm stop position). The tensioner 20 further includes a tensioner actuator 28 which is operatively connected to the tensioner pulley 22 and tensioner arm 24 to move the pulley 22 and arm 24 between the free arm stop and load stop positions. The tensioner 20 may include structure that dampens its motion.

The belt tensioner 20 may have any suitable structure that provides the aforementioned capabilities. For example, the arm 24 may telescope linearly and may be biased outwards by a compression spring, which may be the tensioner biasing member 26. The first end of the spring 26 engages the arm 24, and a second end of the spring 24 engages a base 30. The base 30 is movable along the arm 24 by the tensioner actuator 28. For example, the tensioner actuator 28 may include an electric motor 29 that turns a lead screw 31, whose rotation drives a traveler 33 forwards or backwards on the lead screw 31 as is known in the art of screw drives. The base 30 is connected to the traveler 33 and moves therewith. The base 30 may be hollow and the arm 24 may telescope outwards from it. Thus, the arm 24 is movable independently from the base 30 and from the lead screw 31 and traveler 33. In another embodiment the lead screw 31 itself is moved axially by a suitable drive linkage that would include a stationary lead screw nut positioned fixedly in the housing of the actuator 28. The lead screw 31 in such an embodiment could simply abut the base 30.

The tensioner actuator 28 is controllable to drive the base 30 forward so as to increase the amount of compression in the spring 26 thereby increasing the biasing force exerted on the arm 24 and in turn the pulley 22 in the free arm stop direction, or to drive the base 30 backwards so as to decrease the amount of compression in the spring 26, thereby reducing an actuator force exerted on the pulley 22 in the free arm stop direction. The biasing force of the spring 26 may be referred to as an actuator force since the actuator 28 controls the magnitude of this force. The tensioner actuator 28 may have any suitable motive means with which to drive the movement of the base 30 instead of an electric motor, such as, for example, pneumatic or hydraulic, a shape memory metal actuator, or some other means. For example, a pneumatic cylinder could be used, which drives the pulley 22 in the free arm stop direction using positive (i.e. greater than atmospheric) pressure as a driving force. Alternatively, a pneumatic cylinder that drives the pulley 22 in the free arm stop direction using negative pressure (i.e. by drawing a partial vacuum on one side of the pneumatic cylinder) could be used. Alternatively, a hydraulic cylinder could be used. In another alternative, any of the aforementioned cylinders could instead be pneumatic or hydraulic rotary actuators.

Figure 1B:
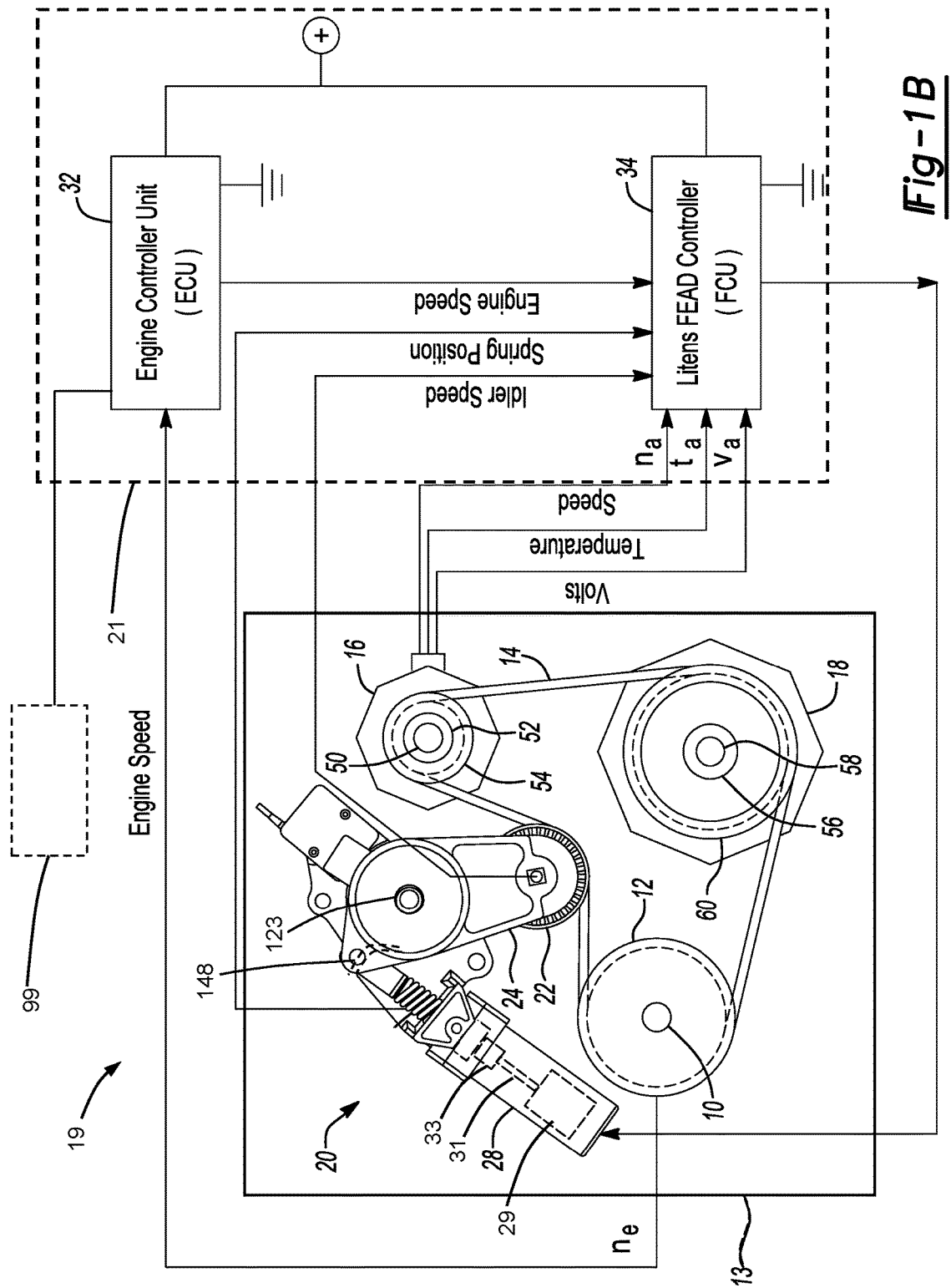
FIG. 1b is a front elevation view of an alternative tensioning system similar to the tensioning system shown in FIG. 1a, but with a pivoting tensioner instead of a linear, non-pivoting tensioner.

In an alternative embodiment shown in FIG. 1*b*, the tensioner arm 24 is pivotable about a tensioner arm pivot axis. The tensioner biasing member 26 may be a torsion spring which is engaged at a first end with the arm to bias the arm towards the free arm stop. The second end (shown at 148) of the torsion spring 26 may be engaged with the tensioner actuator 28 which moves the second end of the spring 26 to increase or decrease the biasing force (i.e. the actuator force) of the spring 26 on the tensioner arm 24.

Figure 1C:
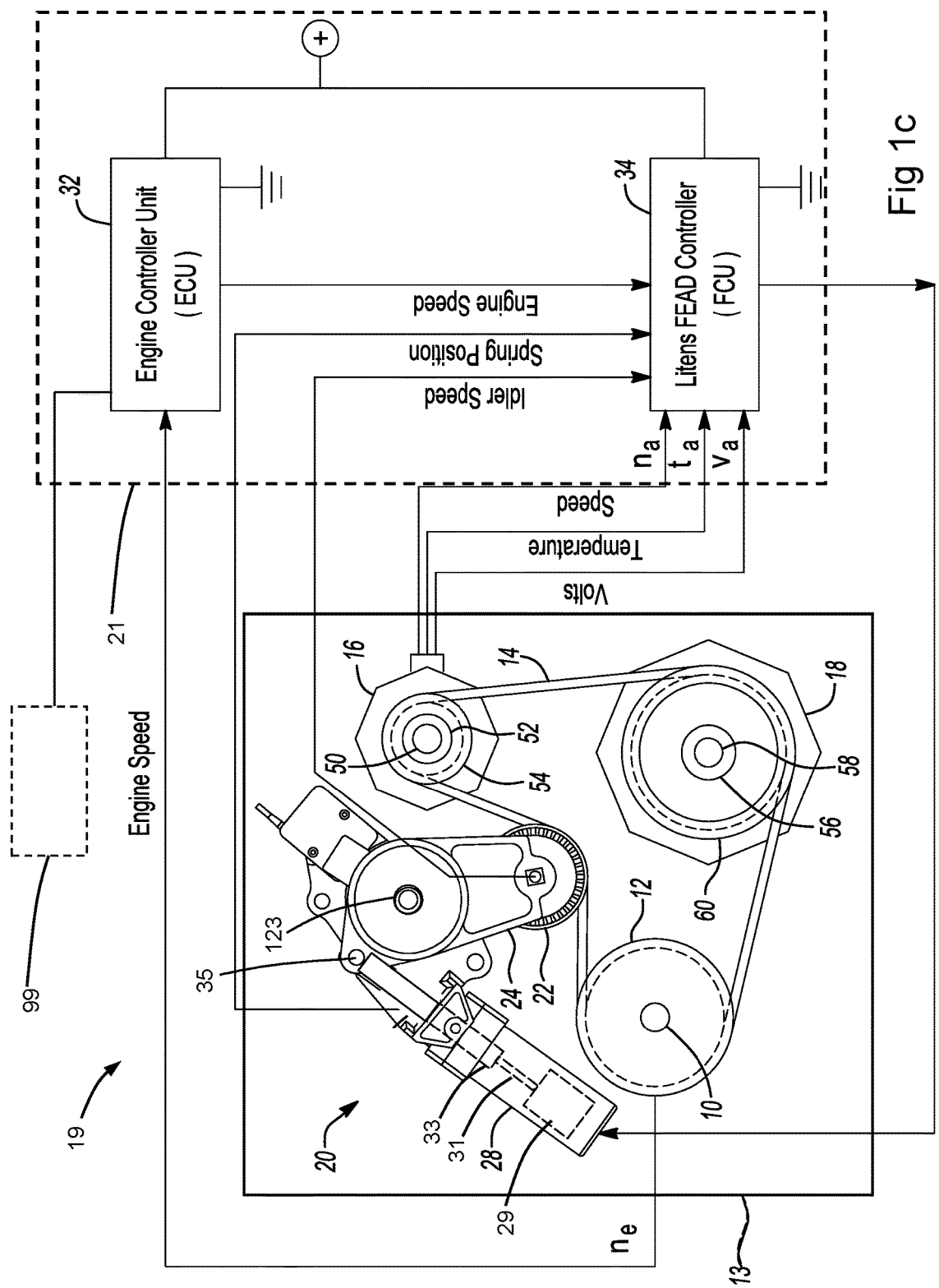
FIG. 1c is a front elevation view of an alternative tensioning system similar to the tensioning system shown in FIG. 1b, but with an actuator that is connected to a tensioner arm of the tensioner by a pivotal connection.

In another alternative embodiment shown in FIG. 1*c*, the tensioner actuator 28 is connected to the tensioner arm 24 via a pivotal connection as shown at 35. Thus, movement of the tensioner actuator 28 results in movement of the tensioner arm 24 via a geometric relationship.

In another alternative embodiment shown in FIG. 1*c*, the tensioner actuator 28 is connectable to the tensioner arm 24 by way of an actuator abutment surface 150 on the traveler 33 that engages a tensioner arm abutment surface 152 that may be cylindrical so that regardless of the angle of the tensioner arm 24 the force acting on the tensioner arm 24 from the actuator 28 is always in the same direction. Thus in this embodiment, the traveler 33 constitutes an actuator abutment member. And the pin on which the abutment surface 152 is positioned constitutes a tensioner arm abutment member.

Examples of suitable structures for the belt tensioner 20 may be found in PCT publication number, WO2010/094127A1, and in U.S. Provisional patent applications 61/382,892, 61/381,929, and 61/391,266, all of which are incorporated herein by reference. Examples of suitable actuators that can be used to drive the second end of the torsion spring may be found in U.S. Pat. Nos. 3,954,016, 4,131,306, 4,674,781, 4,850,466, 4,885,954, 4,893,704, 5,338,076, 5,634,676, 5,862,903 and 5,983,739, all of which are incorporated herein by reference.

Figure 2A:
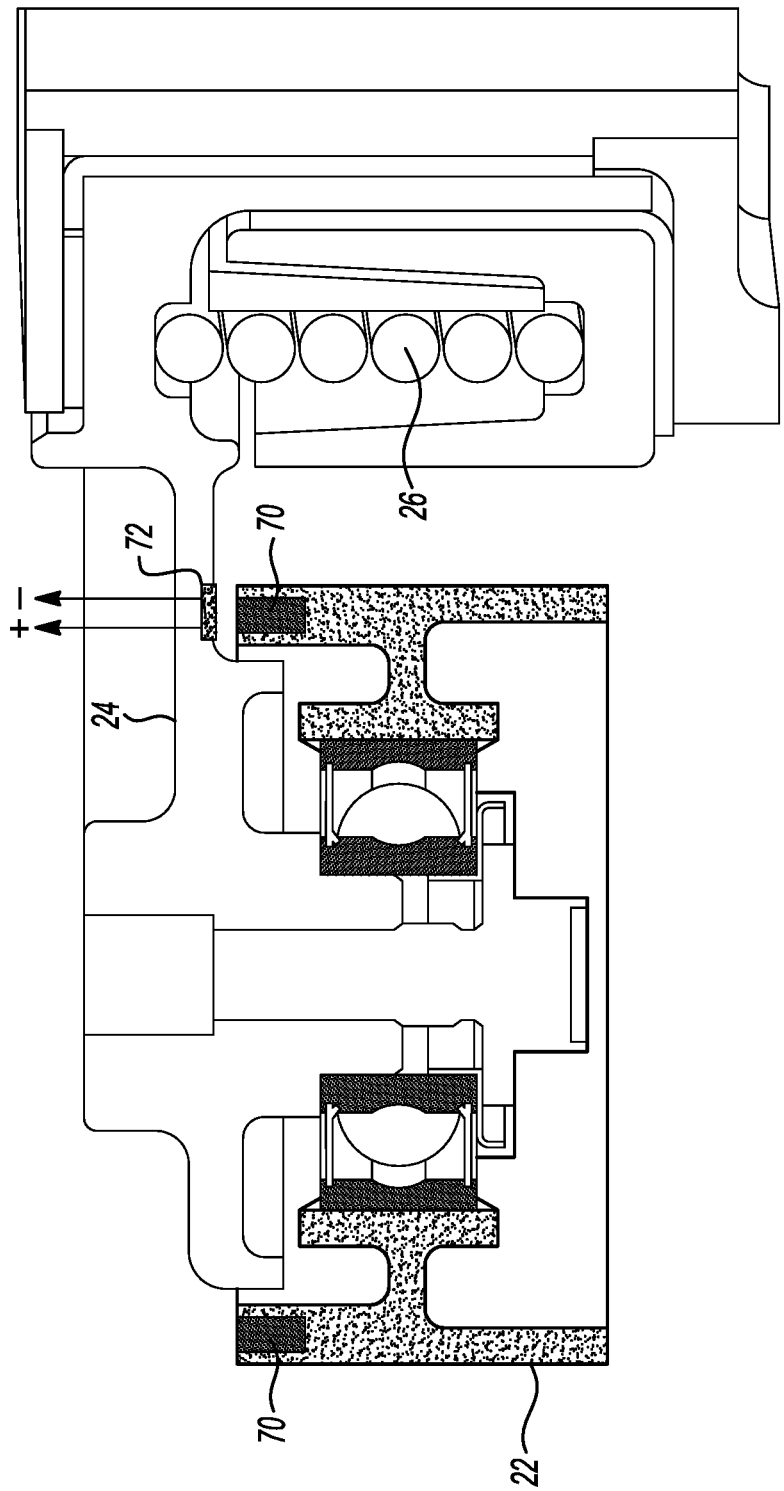
FIG. 2a is a sectional side view of a tensioner that is part of the tensioning system shown in FIG. 1b.
Figure 2B:
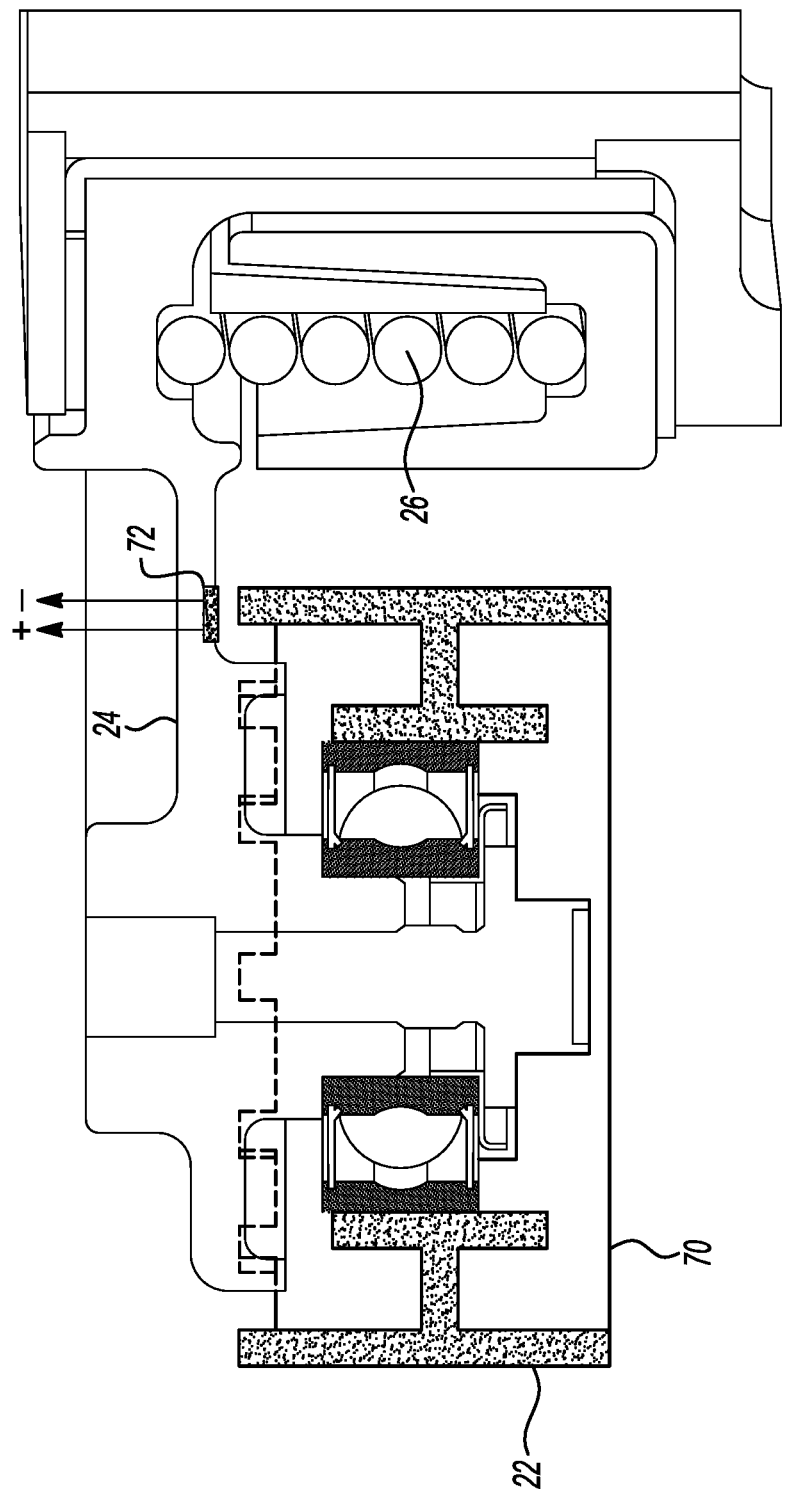
FIG. 2b is a sectional side view of an alternative tensioner that can be part of the tensioning system shown in FIG. 1b.

It may be desired to determine the speed of rotation of the tensioner pulley 22, which can provide a relatively accurate value for the speed of the belt 14 during operation of the belt tensioning system since there is relatively little belt slip between the belt 14 and the pulley 22, since the pulley 22 has relatively little inertia and relatively little resistance to rotation. To provide a value for the speed of rotation of the pulley 22 any suitable means may be used. For example, sensor trigger, such as a magnet or a metal target, shown at 70, may be placed in the pulley as shown in FIG. 2a, and a suitable sensor 72, such as a Hall-effect sensor may be positioned in the tensioner arm 24. A plurality of the magnets or metal targets 70 may be spaced equally from each other about a circle at some radius on the pulley 22. Alternatively, as shown in FIG. 2b, a plurality of sensor triggers, such as teeth, protrusions, or conversely, recesses, could be incorporated into the pulley 22 and a suitable sensor 72, such as a Hall-effect sensor, could be mounted to a stationary element to sense the passage of the sensor triggers 70.

The pulley 22 may be machined from a suitable metal, or spun from metal sheet into a flanged configuration as shown. One or more teeth, recesses, protrusions, targets or other sensor triggers 70 may be machined into whichever edge of the pulley passes overtop of the sensor 72. As an example, the pulley may be machined from magnetic steel.

The sensor 72 is positioned to be able to detect the passing of the sensor triggers. For balance purposes, should the pulley be required to spin at very high RPM's, it may be beneficial to have at least two sensor triggers 70 that are equally spaced apart on the pulley flange so as to balance the inertia of the targets when the pulley 22 spins at high speed.

As more sensor targets 70 are provided at equal spacings on the pulley edge the balance of the pulley 22 improves. Thus for applications where the pulley's RPM is high, it is more beneficial to configure the pulley 22 with an increased number of sensor triggers 70 to improves its dynamic balance. As the number of teeth (or more generally, sensor triggers 70) increases, the accuracy of the determined RPM increases in addition to the improvement in balance. As shown in FIG. 2b the pulley 22 may have any suitable number of sensor triggers 70, such as, 10 sensor triggers.

The sensor 72 may include a processor which counts the passage the sensor triggers 70 overhead, and thereby determine the instantaneous RPM of the pulley 22. Once the RPM of the pulley 22 is known, the belt speed can be determined with high accuracy.

The tensioner control system 21 may, in the embodiment shown in FIG. 1a, includes a dedicated FEAD (Front End Accessory Drive) system control unit (FCU) 34. In some embodiments, the FCU 34 may make up the entirety of the tensioner control system 21. In other embodiments, some control of the tensioner 20 may be carried out by the engine control unit (ECU), which is shown at 32, and which is traditionally provided in vehicles, such as the vehicle 11 to control certain aspects of the operation of the engine 13. In such embodiments, the ECU 32 may be considered to be part of the tensioner control system 21, as shown in FIG. 1a. In yet other embodiments no FCU is provided, and the ECU 32 controls all aspects of the tensioner 20. Thus, in such embodiments, the ECU 32 makes up the entirety of the tensioner control system 21.

The tensioner control system 21 may receive sensor data from several sources, including, for example, signals from a speed sensor on the crankshaft 10 that indicates the speed of rotation of the crankshaft 10. The tensioner control system 21 additionally may receive signals from one or more other components indicative of the states of those components. For example, the tensioner control system 21 may receive signals indicative of the crankshaft speed, the alternator voltage output, the alternator speed, the alternator temperature, the position of the tensioner biasing member 26, and the speed of the tensioner pulley 22 (as described above, using one or more sensor triggers 70 and sensor 72).

Some other exemplary sensor inputs are shown generally at 99 in FIG. 1a, and are shown individually in FIG. 5. Other sensors and devices that may optionally communicate with the tensioner control system 21 include: an ambient temperature sensor 100, an ambient humidity sensor 102, an underhood temperature sensor 104, a rain sensor 106 (e.g. that is incorporated into the windshield, shown at 107 in FIG. 4), the windshield wiper system shown at 110 in FIG. 4, a GPS sensor 112, a wireless internet access system 114, an anti-lock braking system (ABS) 116, a traction control system 118, a key fob sensor 120, a window defroster 122 and an HVAC system 124.

The tensioner control system 21 can determine if any slip is occurring at any of the pulleys for the crankshaft 10, the alternator 16 and the compressor 18 based on any detected differences between their actual measured speed and the speed they should be rotating at based on their pulley diameter as compared to that of the tensioner pulley 22. If any slip is detected, or if the slip detected on any pulley exceeds an upper threshold value, such as about 3% to about 4%, the tensioner control system 21 may increase the actuator force so as to increase belt tension, so as to reduce or completely eliminate the slip. The increase in the actuator force may be by a discrete amount such as 25N after which the slip is rechecked to determine if it is below the upper threshold value. Alternatively, the increase in the actuator force may be continuous with continuous determination of the slip being made by the tensioner control system 21. In either case the tensioner control system 21 may stop increasing the tension once it determines that the slip is below the threshold value for all pulleys. Conversely, if the slip detected on all the pulleys is below a lower threshold value (which may be, for example, about 2%), then the tensioner control system 21 may decrease the actuator force so as to reduce belt tension in order to provide improved fuel economy and reduce power losses. The decrease may be continuous, or it may be in discrete amounts.

One way of determining if there is belt slip is by measuring the signals from the diode rectifiers that are part of the alternator 16, and comparing the speed of the alternator rotor that is implied by those signals to a measured speed for the crankshaft pulley 12.

The engine control unit 32 may indicate to the FCU 34 what action the engine control unit 32 is about to take. For example, the engine control unit 32 may indicate to the tensioner control system 21 that it is about to turn on the air conditioning compressor 18. As a result, the tensioner control system 21 may be capable of using the incoming signals to determine that belt slip is about to occur, or that the load on the belt 14 is about to increase. In case of one of these determinations the tensioner control system 21 may preemptively increase the actuator force on the tensioner pulley 22 so as to increase the belt tension prior to these events occurring. As a result, the belt slip is reduced (or even prevented).

In another scenario, the vehicle 11 may include the key fob sensor 120, as is provided on many vehicles today. In some vehicles, such sensors sense the presence of an electronic key fob shown at 121 even if a user has not pressed any buttons on the key fob 121. In such cases, the vehicle 11 may automatically open or unlock the front, driver's side door when a person with the key fob 121 approaches the vehicle. Alternatively, more conventionally, the key fob sensor 120 may be equipped to sense the presence of the key fob 121 when a user presses a button on the key fob 121 to initiate some action, such as unlocking the vehicle doors. In either case, the tensioner control system 21 may be configured to receive signals from the key fob sensor 120 indicative of the presence of the key fob. When the key fob sensor 120 senses the presence of the key fob 121, the tensioner control system 21 may determine that the vehicle engine 13 may be started imminently. Engine startup introduces a relatively high load on the belt 14, and can cause belt slip in a belt that is under too little tension. In order to reduce the likelihood of belt slip, the tensioner control system 21 may increase the actuator force on the tensioner pulley 22 to a relatively high level so as to increase belt tension prior to engine startup so as to prevent belt slip from occurring. After a predetermined period of time, the tensioner control system 21 may be programmed to reduce the belt tension by reducing the actuator force from the relatively high level to a lower level.

In situations where there are multiple drivers of the vehicle, each of whom has a key fob 121, the key fobs 121 may be configured to send unique signals, so as to permit the tensioner control system 21 to be able to distinguish one key fob 121 from another, thereby permitting the tensioner control system 21 to identify which particular driver is approaching the vehicle 11. In such cases, the tensioner control system 21 may be programmed to learn the driving habits of each user and to keep the information in memory so that the tensioner control system 21 can predict whether the sensed driver is likely to drive aggressively or calmly. In the event that the tensioner control system 21 determines that an aggressive driver is approaching the vehicle 11, the tensioner control system 21 may be programmed to keep the belt tension at a relatively high level throughout the driving event with that particular driver. Alternatively, the tensioner control system 21 may be programmed to have a selected set of driving conditions that cause it to increase the belt tension, wherein the particular threshold values for the driving conditions that cause it to increase belt tension differ depending on which driver is sensed.

Wet Belt Detection

In another example, the tensioner control system 21 may receive one or more signals that indicate that the belt 14 may be wet. For example, the tensioner control system 21 may receive a signal from the vehicle's rain sensor 106 if one is provided that indicates that it is raining on the vehicle 11. Alternatively or additionally, the tensioner control system 21 may receive a signal from the windshield wiper system 110. If the tensioner control system detects, for example, that the windshield wiper system 110 is in use for more than a selected period of time which may be indicative of rain and thus a wet belt 14. Vehicle drivers sometimes use the windshield wiper system on a vehicle when it is not raining, for short periods of time, e.g. to clean the windshield using windshield wiper fluid. Thus a short period of time using the windshield wiper system would not necessarily be indicative of rain.

In another example of how the tensioner control system 21 may detect a potentially wet belt 14, the tensioner control system 21 may receive a signal that the humidity is high (e.g. from the humidity sensor 102). This can be an indication that it is raining, or that the vehicle 11 is in some sort of situation where the belt 14 is potentially wet. When the belt 14 is wet, there is an increased likelihood of belt slip at any given belt tension, as compared to a dry belt 14. When the tensioner control system 21 determines that the humidity is high, the tensioner control system 21 may be programmed to automatically increase the actuator force on the pulley 22 so as to increase belt tension and reduce the potential for belt slip.

In a scenario where the tensioner control system 21 has determined that a particular level of belt tension is suitable for a particular situation, the tensioner control system 21 may augment the belt tension to a higher level in a situation where it detects high humidity. Instead of, or in addition to, humidity sensor 102, the belt tensioning system may include some other sensing means to detect a wet belt 14 or the potential for a wet belt 14, to trigger it to increase the belt tension.

In addition to the above, the tensioner control system 21 may be programmed to determine whether there is potential for the belt 14 to be wet based on the humidity sensor 102, the ambient temperature sensor 100 and the underhood temperature sensor 104. In situations where the underhood temperature 104 is lower than the ambient temperature by a sufficient amount, and the humidity is sufficiently high, there is the potential for condensation of water vapour in the air to occur on the belt 14. Similarly, based on the humidity sensor 102 and the ambient temperature sensor 100 or the underhood temperature sensor 104, the tensioner control system 21 can detect situations where there is a drop in temperature than can lead to the formation of condensate on the belt 14, such as can occur while a vehicle 11 is parked overnight.

Another way for the tensioner control system 21 to determine if there is potential for the belt 14 to be wet is based on signals from the ambient temperature sensor 100 and the ABS 116 and/or the traction control system 118. For example, if the ABS 116 and/or the traction control system 118 indicate that there is slippage of the wheels on the road, and the temperature sensor 100 indicates that it is above a selected temperature to preclude the possibility of slippage on ice (and optionally if the sensed humidity is at least a selected level) then the tensioner control system 21 may determine that there is water on the ground and that there is a possibility of a wet belt 14 either from kick up of water under the vehicle 11 onto the belt 14 or from rain. In another scenario, the tensioner control system 21 may determine that there may be kickup of water onto the belt 14 if the sensed temperature is about 0 degrees Celsius and the traction control system 118 and/or the ABS 116 indicate that slippage of the wheels is occurring.

Another way for the tensioner control system 21 to determine if there is potential for the belt 14 to be wet may be via the wireless internet connection 114 in conjunction with the GPS sensor 112. For example, using the GPS sensor 112, the tensioner control system 21 can determine the position of the vehicle 11 and using the wireless internet connection 114 the tensioner control system 21 can determine whether it is currently raining in the immediate vicinity of the vehicle 11.

In addition to the above, the GPS sensor 112 may be used by the vehicle in conjunction with a navigation system. The tcs 21 can thus assess whether the vehicle 11 is on a highway or on city streets, for example. If the tcs 21 determines that the vehicle 11 is on a highway, it can reduce the belt tension assuming that other conditions permit it.

The tensioner control system 21 may additionally receive signals from other sources to assist in determining if there is potential for the belt 14 to be wet. For example, the tensioner control system 21 may use the state of the window defroster 122 and/or the particular setting for the HVAC system, optionally in conjunction with other data (e.g. from temperature sensors 100 and 104, and humidity sensor 102), to assist in determining whether a wet belt condition is likely to exist.

Capability to Prevent Hunting

In yet another example, the tensioner control system 21 may receive signals from the throttle sensor or from the engine control unit 32 that the driver is driving aggressively, and is repeatedly accelerating rapidly and/or is repeatedly letting off the throttle rapidly. In a less sophisticated embodiment, each time the driver accelerates (particularly if he/she accelerates hard), the tensioner control system 21 will drive the actuator force up to increase the belt tension to prevent slip, and each time the driver suddenly releases the throttle, the tensioner control system 21 will drive the actuator force down to decrease the belt tension since high tension may be considered not necessary. It will be understood that driving the actuator 28 consumes energy. Repeatedly driving the actuator force up and down can in some situations consume as much or more power than is saved by the overall reduction in average belt tension, and can shorten the life of the tensioner actuator 28 and other components. In a more sophisticated embodiment of the invention, after a sufficient number of repetitions of these actions are detected by the tensioner control system 21, the tensioner control system 21 may determine that this driving behaviour is likely to continue and as a result, the tensioner control system 21 may simply leave the actuator force (and thus the belt tension) at a high setting to prevent hunting of the actuator 28 to reduce and increase the actuator force in an attempt to achieve a constantly moving or oscillating target. Once the tensioner control system 21 detects that the driver's driving behavior has changed and he/she is no longer driving as aggressively for a sufficient period of time, the tensioner control system 21 may decide to permit the reduction of the belt tension.

Further with respect to reducing the tendency of the tensioner actuator 28 to hunt continuously, the tensioner control system 21 may be programmed to raise or drop the belt tension by discrete amounts as opposed to continuously adjusting it to achieve the optimal belt tension for dynamic conditions. The tensioner control system 21 may be programmed to increase and decrease belt tension always, or alternatively it may be programmed to increase and decrease belt tension only under certain conditions, while permitting hunting (i.e. substantially continuous adjustment of the belt tension) under other conditions. An example of the use of a discrete change in belt tension is in a situation wherein the belt tension that the tensioner control system 21 determines is appropriate for the belt 14 progressively increases over a certain period of time. Instead of progressively increasing the belt tension to approximately match the belt tension determined to be appropriate, the tensioner control system 21 may decide to increase the belt tension to a selected high setting, which may be higher than the belt tension determined to be appropriate, and to leave it there for a period of time, (unless it becomes necessary to increase it further). This is in contrast to a strategy where a closed loop control algorithm, such as a PID control algorithm, would have the tensioner control system 21 constantly adjusting the belt tension upwards in an effort to match the belt tension determined to be appropriate as closely as possible. In some embodiments however, a control algorithm such as a PID control algorithm may be used by the tensioner control system 21 to control the position of the tensioner arm 24 or a position for the tensioner biasing member 26 in order to achieve a selected position for the tensioner arm 24 or a selected actuator force.

Also related to the reduction of the tendency of the actuator 28 to hunt, the tensioner control system 21 may be programmed to receive a large number of inputs (some of which may in addition to those shown or described herein), and may be able to determine a trend in the inputs to determine whether to increase belt tension, decrease belt tensioner or to leave the belt tension unchanged.

Another way that the tcs 21 is configured to reduce the tendency of the tensioning system 19 to hunt is through the use of a relatively greater number of inputs from sensors and devices in the vehicle 11 before taking action to change the belt tension. For example, in the event that the tcs 21 receives a signal that the windshield wipers 110 are on, the tcs 21 may look to other data inputs before concluding that it is raining and that the belt 14 is at risk of getting wet. For example, the tcs 21 may assess whether the rain sensor 106 has detected rain on the windshield 107. Additionally, or alternatively, the tcs 21 may check the humidity from the humidity sensor 102, or any other sensor or device that could indirectly support a conclusion that it is raining or that it is not raining. Additionally or alternatively the tcs 21 may assess whether the windshield wipers 110 are still on after some selected period of time. If enough data inputs suggest that it is raining, then the tcs 21 may take action to increase the belt tension so as to reduce the likelihood of belt slip.

In another scenario, the tensioner control system 21 may detect a situation where the engine speed is low (i.e. below a selected threshold). Resonance can occur in the belt 14 depending on certain factors, such as the engine speed, the load on the belt 14 and the belt tension. Resonance can cause the belt 14 to flutter and can in some situations cause damage to or failure of the belt 14. In particular, some belts that are proposed for use or are in use in vehicles today are relatively thinner than some belts previously used, which makes them even more prone to flutter. To inhibit this from occurring the tensioner control system 21 may be programmed to detect situations where the engine speed and belt load would lead to an increased risk of resonance at a given belt tension, and to increase the belt tension so as to reduce the risk of belt flutter.

As shown in the examples described above, the tensioner control system 21 may thus be capable of predicting situations in which belt slip may be imminent, or in which increased belt load may be imminent and may be able to control the belt tension before these events take place.

Control of Belt Tension by Controlling Operation of Accessories

As described above, the tensioner control system 21 can control the actuator force on the pulley 22 so as to reduce the belt tension where possible and to increase the belt tension when needed. This provides an overall improvement in fuel economy for the vehicle 11, as compared to a tensioner that is not controllable. However, this is, in some ways, a passive approach to reducing belt tension to improve fuel economy (which may be referred to as fuel efficiency). In some embodiments, the tensioner control system 21 may take an active approach to reducing belt tension to improve fuel economy.

For example, the tensioner control system 21 may be operatively connected to one or more of the alternator 16, the air conditioning compressor 18 and any other accessories driven by the belt 14. It will be understood that each of these accessories represents a load on the belt 14, and each requires a certain amount of belt tension to operate without belt slip. By having two of these loads operate at the same time, as can commonly occur, the belt tension must be increased further in order to reduce the likelihood of slip. In an effort to reduce the maximum belt tension required to be applied by the tensioner, the tensioner control system 21 may in some situations cause a reduction in the load associated with one of the accessories, when permitting another of the accessories to operate. For example, the tensioner control system 21 may determine that the alternator 16 need not operate at its highest voltage (which increases the amount of magnetic drag is associated with the alternator 16) when the air conditioning compressor 18 is on. Thus, the tensioner control system 21 may reduce the voltage applied to the alternator 16 at those times if possible, and may possibly reduce the voltage to zero (i.e. shutting off the alternator 16). Similarly, the tensioner control system 21 may clutch out (i.e. disconnect) the air conditioning compressor 18 when it determines that the alternator 16 needs to run at high voltage. It will be noted that some alternator types (e.g. some modern high efficiency alternators) have a relatively high amount of drag associated with them in cold weather. As such, the tensioner control system 21 may prevent the alternator 16 from operating during startup of the engine 13 in cold weather since engine startup already introduces a high belt load which calls for a relatively high belt tension in order to reduce the likelihood of belt slip. Once the engine 13 has started up and the belt tension necessary to prevent slip is reduced, the tensioner control system 21 may permit operation of the alternator 16 to be initiated. Furthermore, upon determining that the alternator 16 is at a low temperature (e.g. less than or equal to about −20 degrees C.), the tensioner control system 21 may drive the tension to a high setting when the alternator is operated. Optionally, this condition (the low alternator temperature) may override other logic used by the tensioner control system 21 to modify belt tension. In other words, when initiating operation of the alternator 16 at any time, the tensioner control system 21 may be programmed to generate a high belt tension whenever it detects that the alternator temperature is below the threshold value, and to hold the high belt tension until the alternator temperature rises above a second threshold value, such as, for example, +20 degrees C.

Aside from the temperature considerations regarding the alternator 16, when driving the alternator 16 it is beneficial for the tensioner control system 21 to be able to estimate the torque needed to drive the alternator 16 in order to determine whether to change the belt tension. The alternator torque depends on several factors, including voltage, current and speed. These values can be mapped to estimate torque quickly and easily without significant computational requirements. The tensioner control system 21 can use this estimate to determine what belt tension is suitable.

It will be noted that the operative connection between the tensioner control system 21 and the accessories may be through the FCU 34, or alternatively through the engine control unit 32. For example, the FCU 34 may send requests to the engine control unit 32, and the engine control unit 32 may in turn send instructions to the tensioner motor 29 or to the FCU 34 to send to the motor 29, based on the requests made by the FCU 34 and based on other considerations (i.e. input from other systems and sensors in the vehicle 11). For example, the FCU 34 may send a request to the engine control unit 32 to stop or prevent operation of the alternator 16, and the engine control unit 32 may determine whether this is possible. In some situations, the engine control unit 32 may determine that it is not possible to stop or prevent operation of the alternator 16 due to a critically low state of charge of the vehicle battery (not shown). In such an instance, the engine control unit 32 may send a signal back to the tensioner control system 21 that it cannot stop, slow down or prevent operation of the alternator 16, in which case the tensioner control system 21 may drive up the actuator force accordingly. Overall, however, by providing some control over the accessories, the tensioner control system 21 may be able to reduce the number of times the actuator force (and thus the belt tension) needs to be driven up to high levels. The number of times that the actuator force reaches high levels directly impacts the size of the shafts, bearings and brackets required for the various components associated with the accessories, so that they are sufficiently robust to resist deformation and fatigue. Reducing the number of times that the actuator force reaches high levels can therefore result in the use of relatively smaller shafts, smaller and/or lighter-duty bearings, and lighter brackets. This reduction in weight of the components in turn results in an increase in fuel efficiency for the vehicle 11, and reduces rotational drag associated with the accessories which can result in a further increase in fuel efficiency for the vehicle 11.

Instead of sending instructions to the engine control unit 32, it is alternatively possible for the FCU 34 to directly send commands to one or more of the accessories. However, the engine control unit 32 may also be directly or indirectly operatively connected to the accessories, and it may issue overriding commands to the FCU 34 under certain conditions which prevent the FCU 34 from interfering with the engine control unit's operation of the accessories.

The tensioner control system 21 may receive signals from one or more components that are indicative of the current belt tension so that the tensioner control system 21 can determine if the current belt tension is suitable or not for the current set of conditions. The signals may be from a position sensor 123 that indicates the position of the second end of the tensioner biasing member 24, which gives an indication of the actuator force on the pulley 22, which is indicative of the force of the pulley 22 on the belt 14. The position sensor 123 could be a simple Hall-effect sensor which would send a signal proportionate to the distance between the sensor 123 and the end of the spring 26. A suitable Hall-effect sensor could be a Honeywell SS 520 sensor, supplied by Honeywell International, whose headquarters are in Morristown, N.J., USA. Alternatively a simple turn-counter using a Hall-effect sensor or the like can be used to detect turns of the lead screw 31, which can be used to determine the position of the traveler 33, or, in embodiments wherein the lead screw itself moves axially, the Hall-effect sensor could be positioned to detect the number or turns (i.e. rotations) of a gear that is part of the drive linkage between the electric motor 29 and the lead screw 31. An example of a position measurement device for a pivoting tensioner arm as shown in FIG. 1b, is provided in U.S. Pat. No. 7,188,021, which is incorporated herein by reference. Alternatively, the belt tensioning system 19 may include other, more sophisticated devices, which can more directly measure the belt tension by measuring the force exerted by the belt 14 on one or more components. An example of such a device is a strain gauge on one or more accessory shafts, or on a pulley such as the pulley 22, along with associated electronics for conditioning and signal amplification. An example of such a device is described in U.S. Pat. No. 6,216,547 which is incorporated herein by reference.

ISAF (Idle Stop Accessory Function) and Bas (Belt Alternator Starting)

Figure 3A:
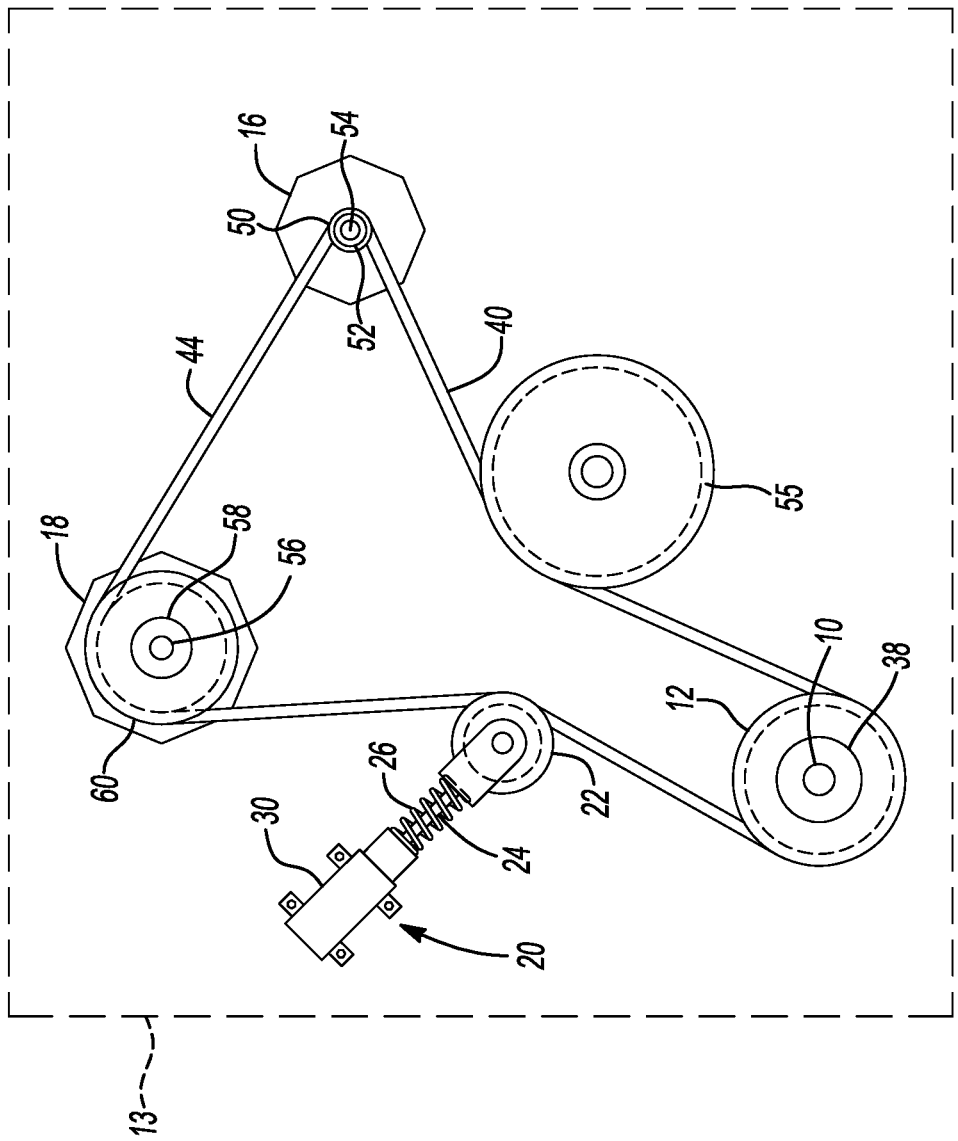
FIG. 3a is a front elevation view of a tensioning system for a belt in accordance with another embodiment of the present invention, wherein accessories driven by the belt can be driven by an engine and by a motor-generator unit, using a linear, non-pivoting tensioner.
Figure 3B:
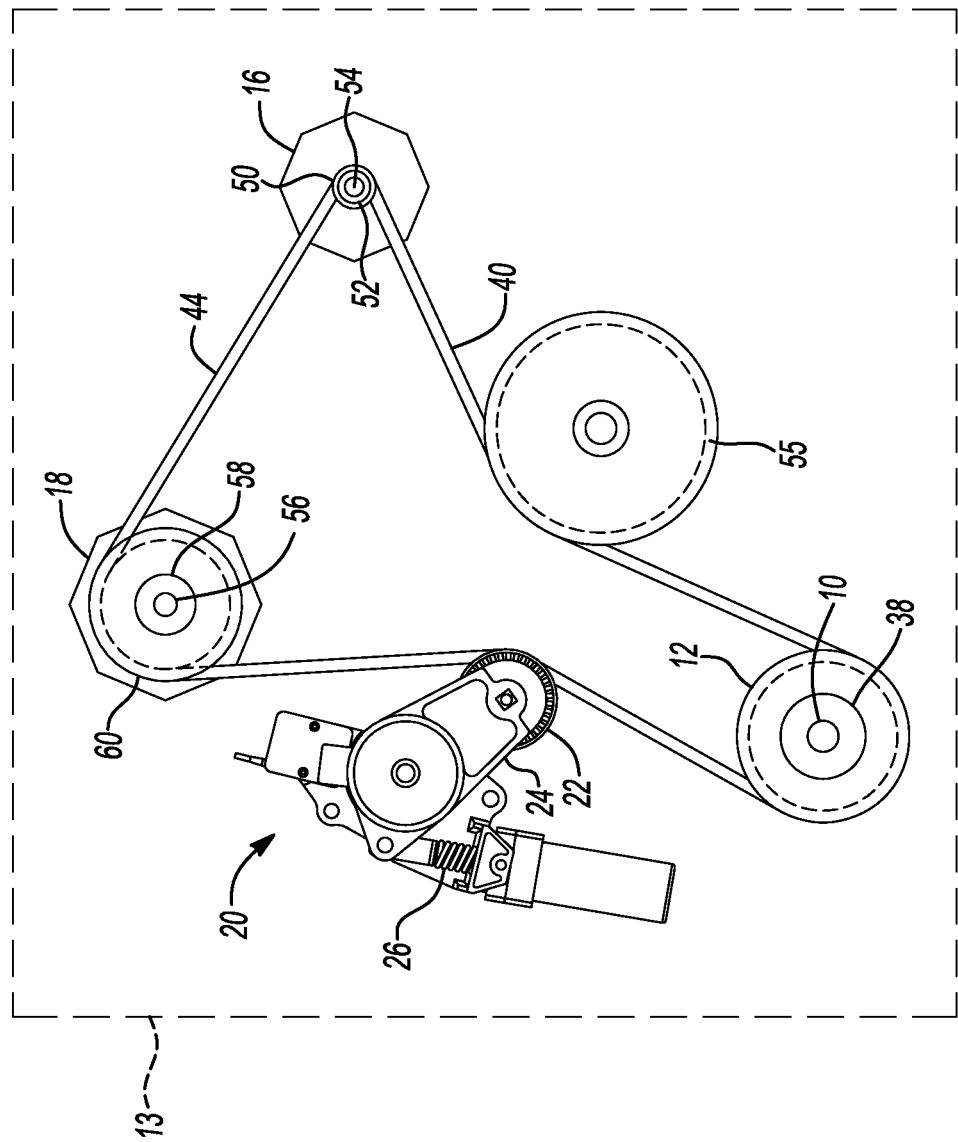
FIG. 3b is a front elevation view of an alternative tensioning system similar to the tensioning system shown in FIG. 3a, but with a pivoting tensioner instead of a linear, non-pivoting tensioner.

In a particular embodiment shown in FIGS. 3a and 3b, the vehicle 11 may be equipped with technology (i.e. programming in the ECU 32) that shuts off the engine 13 temporarily in certain situations to reduce emissions and increase fuel efficiency. For example the engine control unit 32 may shut off the engine 13 when the vehicle 11 stops at a stoplight. When this occurs it may still be desirable to continue operation of one or more of the belt driven accessories, such as the air conditioning compressor 18, for example. To achieve this, the crankshaft 10 may be equipped with a crankshaft clutch 38 through which the crankshaft 10 connects to the crankshaft pulley 12. By disengaging the clutch 38 the belt 14 can now be driven without the engine 13 turning. The engine control unit 32 may be programmed to run the alternator 16 as a motor, which draws power from an electrical source such as the vehicle battery (not shown). In such embodiments, the alternator 16 may be an MGU (Motor-Generator Unit). The MGU 16 can then drive the belt 14 and the other belt-driven accessories. Driving the accessories even when the engine 13 is shut off temporarily (e.g. while at a stoplight) is referred to as ISAF (Idle-Stop Accessory Function), and is described in WO2008/113186A1, which is incorporated herein by reference. It will be noted that in FIGS. 3a and 3b, only the components directly engaged with the belt 14 are shown, such as the crankshaft 10 and related components, the accessories and related components and the tensioner 20. Also, a water pump is shown at 55 in FIGS. 3a and 3b as one of the accessories. The difference between the embodiment shown in FIG. 3a and the embodiment shown in FIG. 3b is that the tensioner 20 in FIG. 3a is a linear tensioner (as shown in FIG. 1a), and the tensioner 20 shown in FIG. 3b is a rotary tensioner (as shown in FIG. 1b).

In embodiments wherein the vehicle 11 has ISAF capability, the tensioner control system 21 may receive a signal through the engine control unit 32 indicating that the engine 13 is being shut off (e.g. when the vehicle 11 is stopping at a stoplight). In such a situation, the tensioner control system 21 may be programmed to reduce the belt tension to a low level. As a result, when the MGU 16 is used to drive the accessories (e.g. the air conditioning compressor 18) there is relatively less power consumption than there would be if the belt tension were set at a high setting. The reduced power consumption is useful in that it increases the amount of time the vehicle's battery (not shown) can support rotation of the MGU 16 for driving the accessories. In situations where the vehicle 11 is in stop-and-go traffic for a long period of time, as can occur in many urban environments, this can be useful, since the vehicle 11 may operate with the engine 13 off for a relatively large percentage of the time that the vehicle 11 is in such traffic, and may thus rely on the battery and MGU 16 for the operation of the accessories for a relatively long period of time with little or no charging of the battery via the engine 13. As a further step to reducing the belt load the tensioner control system 21 may also reduce the refrigerant flow to the air conditioning compressor 18 to a relatively low level so as to reduce the belt load associated with the compressor 18.

In general, while the MGU 16 is being used as a motor to drive accessories through the belt 14, the belt tension 14 may be reduced, as described above, to reduce losses associated with the tightness of the belt, while still keeping sufficient tension in the belt 14 to substantially prevent belt slip. In some instances, however, such as a situation where the tensioner control system 21 determines that extreme measures must be taken to conserve battery power, the tensioner control system 21 may reduce the belt tension so much that some belt slip may be incurred and tolerated at certain pulleys, such as the alternator pulley 50 or the crankshaft pulley 12. At some point when the danger of depleting the vehicle battery no longer exists, the tensioner control system 21 may increase the belt tension again to a level that substantially prevents the incidence of belt slip.

It will be noted that some accessories, such as the pulley for the water pump 55, are positioned on a first side (shown at 40) of the MGU pulley 50. The first side 40 may also be referred as the downstream side since the belt 14 travels to that side after passing over the MGU pulley 50. The second side of the MGU pulley 50 is shown at 44 and may be referred to as an upstream side since the belt 14 travels from that side to the MGU pulley 50. During operation of the MGU 16 as a motor, whereby it drives the belt 14, the downstream side 40 will be the slack side and the upstream side 44 will be the tight side. In other words the belt tension on the downstream side 40 is relatively lower than the belt tension on the upstream side 44 during operation of the MGU 16 as a motor.

In a case where an accessory on the downstream side of the MGU pulley 50 (e.g. the water pump 55) is determined to be necessary to operate without belt slip, the tension in the belt 14 may be increased by the tensioner control system 21 so as to reduce the likelihood of belt slip at that accessory.

In some embodiments, the MGU 16 may be used to start the engine 13 back up after temporarily shutting it down, which is referred to as a Belt-Alternator Starter (BAS) function. To carry out this BAS function, the crankshaft clutch 38 is engaged so that the crankshaft pulley 12 and the crankshaft 10 rotate together, and the MGU 16 drives the belt 14 in order to drive the crankshaft 10, instead of a traditional starter motor. However, it will be noted that the crankshaft pulley 12 is positioned on the downstream side 40 of the MGU pulley 50 (i.e. the slack side).

The lower belt tension on the slack side introduces some potential for slip to occur between the belt 14 and the crankshaft pulley 12. It is possible to add a second tensioner for the belt span on the downstream side 40 of the alternator pulley 12 the motor pulley 50 and the crankshaft pulley 12, however this is an expensive solution. In order to reduce the risk of slip when only one tensioner is provided (i.e. tensioner 20) the tensioner control system 21 may use the tensioner 20, to increase the belt tension on the tight side 44 to a very high level so as to drive up the tension in the belt span on the slack side 40 so as to reduce the likelihood of slip during starting of the engine 13 using the MGU 16. To assist in distributing the tension applied by the tensioner 20 throughout the belt 14 more evenly, one or more of the accessories may be shut off or disconnected via clutches by the tensioner control system 21 when the MGU 16 is used to start the engine 13. Once the engine 13 has been started, the MGU 16 may revert back to operating as an alternator, the belt tension may be reduced and whatever accessories were shut off or disconnected may be started up and/or connected again.

While the alternator 16 has been described as being the motor that drives the belt 14 to drive the other accessories or to start the engine 13, it is alternatively possible for a motor to be provided that is separate from the alternator 16 for this purpose.

In some embodiments, after the vehicle 11 has stopped temporarily (e.g. at a stoplight) and the engine 13 has been shut off, when it is time for the vehicle 11 to move forward, the MGU 16, instead of the engine 13, may be used to provide the initial force to propel the vehicle 11 forward from a standstill when it is time for the vehicle 11 to move again (e.g. when the light has turned green). During use of a vehicle with an internal combustion engine such as engine 13, a relatively disproportionate amount of fuel wastage occurs when the vehicle accelerates from a standstill. Initially, at launch, a large amount of fuel is dumped into the combustion chambers, and may not be thoroughly combusted. Once the vehicle has reached a certain speed, there is less of a tendency for disproportionate amounts of fuel to be fed into the combustion chambers, and so the inefficiency it limited to launch from a standstill (or a very low speed) to a certain speed. To address this issue, the MGU 16 may be used instead of the engine 13 to provide the initial motive force for pulling the vehicle 11 away from a standstill. As a result, the aforementioned initial action of dumping a large amount of fuel in the combustion chambers is avoided, thereby reducing fuel consumption and reducing emissions, in part by avoiding the discharge of uncombusted fuel in the vehicle's exhaust. Once the vehicle 11 has reached a selected speed, the engine 13 can be started up using the BAS capability, and the MGU 16 can then be reverted back to operation as an alternator.

Adjustable Load Stop

In the embodiment shown in FIG. 1c, depending on the signals received from the various sensors and the like connected to the tensioner control system 21, the tensioner actuator 28 may be controlled by the tensioner control system 21 to operate in one of several modes. In a first mode, which may be referred to as a load stop mode, the lead screw 31 drives the traveler 33 until the abutment surface 150 abuts the abutment surface 152. Then the tensioner control system 21 drives the motor 29 to retract the traveler 33 from engagement with the tensioner arm 24 by a selected amount, such as by two turns of the lead screw 31. For example, the selected amount may be a selected number of rotations of the lead screw 31, as measured by a Hall-effect sensor shown at 125 that is positioned to detect a particular feature on the lead screw 31 or on some element that drives the lead screw 31 such as a gear. The sensor 125 may be any suitable type of sensor that is capable of detecting the position of the lead screw 31 or, more broadly, that is capable of detecting the position of the abutment member (i.e. the traveler 33). The sensor 125 may be referred to as an abutment member position sensor. Other types of sensor may be used as the sensor 125. For example, the sensor 125 may be an LVDT (Linear Variable Differential Transformer) sensor that is arranged to sense the linear movement of the traveler 33. The sensor 125 may alternatively be any other suitable type of sensor.

By using the sensor 125, the tensioner control system 21 can drive the lead screw 31 in a first direction (towards the tensioner arm 24) until the abutment member 33 engages the tensioner arm 24, and can then retract the abutment member 33 by a selected amount (i.e. in a second direction, away from the tensioner arm 24). In this way, the abutment member 33 serves to set the position for the load stop for the tensioner arm 24. It will be understood that the lead screw 31 is configured (by virtue of the helix angle of the lead screw thread) to prevent back-driving by the traveler, so as to ensure that the force of the belt 14 on the pulley 22 does not drive the traveler backwards along the lead screw 31. Periodically, (e.g. when the vehicle 11 is started up from a cold start), the position of the abutment member 33 may be adjusted to take up any additional slack that may have developed in the belt 14. Thus, the position of the abutment member 33 is not, in such an embodiment, continuously adjusted in an attempt to follow the tensioner arm 24 in real time. The distance by which the abutment member 33 is retracted may be referred as the retraction distance, and may be selected by any suitable criteria. For example, the abutment member 33 may be positioned suitably far from the abutment surface 152 so that it is not being hit too frequently when the tensioner arm 24 incurs torsionals from the engine 13, but it may be positioned suitably close to the abutment surface 152 so that it can be driven into engagement quickly with the abutment surface 152 in the event that a high belt tension is needed quickly. In the event that the selected retraction distance is not large enough (i.e. in the event that the tensioner control system 21 senses that the tensioner arm 24 is hitting the abutment member 33 too frequently), the tensioner control system 21 may adjust the retraction distance upwards in an attempt to reduce the frequency of collisions of the tensioner arm 24 and the abutment member 33 resulting from engine torsionals.

By keeping the abutment member 33 close to the tensioner arm 24 so that the abutment member 33 can be brought into operative engagement with the tensioner arm 24 quickly if desired, permits the use of a relatively smaller, lesser powered, slower, lower cost electric motor 29 while still providing relatively quick reaction times by the tensioner 20 if the tensioner control system 21 determines that the belt tension should be increased quickly, regardless of the position of the tensioner arm 24.

In order to determine when the abutment member 33 engages the tensioner arm 24 prior to retraction of the abutment member 33, the tensioner control system 21 may be configured to sense an increase in the current that is drawn by the electric motor 29. Alternatively any other suitable sensing means may be provided.

In another mode of operation, the abutment member 33 may be used to increase the tension in the belt 14. In an exemplary embodiment, the abutment member 33 is driven into engagement with the tensioner arm 24 until the tensioner control system 21 senses the increase in current to the electric motor 29, as with the first mode described above. However, upon detection of engagement, the tensioner control system 21 drives the electric motor 29 further in the same rotational direction, so as to further drive the abutment member 33 into the tensioner arm 24. The further driving may be for example for a selected number of turns of the lead screw 31, or alternatively the lead screw 31 may simply continue to be driven until the electric motor 29 stalls. It will be noted that control of the tensioner arm 24 as described in this second mode of operation (a high tension mode), is not based on reaching a particular belt tension. Rather, it is based simply on increasing the tension to some high value that may not be known, or may not be precisely known, to avoid belt slip in those situations where the tensioner control system 21 determines that is warranted.

In yet another mode, which may be referred to as a retracted mode, the lead screw 31 may be rotated backwards to retract the abutment member 33 to a home position. A suitable sensor such as a Hall-effect sensor or a limit switch may be used to detect when the abutment member 33 has reached the home position. This may be the only absolute position sensor that is provided for the abutment member 33. Once this position is reached, the absolute position of the abutment member 33 may be known, and so using the turn-counting sensor 125, which is a relative position sensor, the absolute position of the abutment member 33 may be ascertained throughout its travel towards the tensioner arm 24.

It will be noted that the operation of the tensioning system shown in FIG. 1c may be carried out without the use of sophisticated sensors for detecting belt tension or tensioner arm position (although the tensioner arm position sensor 123 is shown, but it is not a necessary feature). Using the position sensor 125, a sufficiently accurate position can be determined for the tensioner arm 24, which in turn can be used to obtain a sufficiently accurate determination of the belt tension for the purposes of at least some embodiments described herein.

In embodiments wherein a compression spring is used as the tensioner arm biasing member 26, it will be understood that the compression spring need not be a coil spring. It could alternatively be a closed cell foam spring, for example.

In some embodiments, the values for the data inputs to the tcs 21 that would trigger the tcs 21 to change the tension setting for the belt 14 may be static values that are stored in memory in the tcs 21. For example, these values may be stored in the form of a lookup table. In some embodiments, the table may not be static however. For example, in some embodiments the table may have selected values changed if during operation of the vehicle, the tcs 21 detects slip in certain situations where none was expected. In some embodiments the tcs 21 may be limited in the amount that it can change a particular value in the lookup table. In some embodiments the tcs 21 may only be permitted to change values in the lookup table if certain events occur with at least a selected frequency or a selected number of times. For example, if the tcs 21 detects belt slip in a particular set of conditions once where slip was not expected, the tcs 21 may not update the lookup table right away so that a high tension setting is requested under those conditions. Instead, the tcs 21 may only do that if slip is detected under those conditions with the originally suggested tension setting more than a selected number of times.

For greater certainty, it is not necessary in all embodiments for the tensioning system 19 to generate a particular absolute tension value in the belt under a particular set of conditions. Instead, in some embodiments, the tensioning system 19 may simply increase the tension or decrease the tension by selected amounts depending on the conditions sensed by the tcs 21.

Aside from the inputs described above, other inputs that may be sensed by the tcs 21 to assist in the determination of the appropriate tension setting for the belt 14 or the appropriate position setting for the tensioner arm 24 include: headlight operational state (e.g. on or off or high-beams on)

While the description contained herein constitutes a plurality of embodiments of the present invention, it will be appreciated that the present invention is susceptible to further modification and change without departing from the fair meaning of the accompanying claims.

What is claimed:

1. A tensioning system for tensioning an endless drive member in a vehicle, comprising:
   a tensioner including a tensioner pulley that is movable between a free arm stop position and a load stop position, and further including a tensioner actuator operable to exert an actuator force on the tensioner pulley to drive the tensioner pulley towards the free arm position; and
   a tensioner control system operatively connected to the tensioner actuator to control the actuator force on the tensioner pulley, wherein the tensioner control system is operatively connected to at least one vehicle accessory that is driven by the endless drive member, wherein the tensioner control system is programmed to:
   a) issue commands for controlling the operation of said at least one vehicle accessory so as to control the tension in the endless drive member; and
   b) control the actuator force on the tensioner pulley to control the tension in the endless drive member based at least in part on the issued command,
   wherein the tensioner control system is configured to receive signals indicative of the speed of the tensioner pulley and the speed of at the at least one vehicle accessory, and is programmed to:
   determine the amount of slip that exists between the endless drive member and the at least one vehicle accessory based on the speed of the tensioner pulley and the speed of the at least one accessory; and
   control the actuator force to control the amount of slip.

2. A tensioning system as claimed in claim 1, wherein the vehicle includes a engine control unit that is operatively connected to the at least one vehicle accessory, and wherein the tensioner control system is programmed to issue the commands for controlling the operation of the at least one vehicle accessory to the engine control unit, and is further programmed to determine whether the engine control unit will execute the commands or not.

3. A tensioning system as claimed in claim 1, wherein the at least one vehicle accessory includes an alternator and wherein the tensioner control system is configured to receive signals indicative of the speed of the alternator, the temperature of the alternator and the voltage output of the alternator, and wherein the tensioner control system is programmed to control the operation of the alternator based on the level of charge in a vehicle battery that is charged by the alternator, and based on the tension in the endless drive member.

4. A tensioning system as claimed in claim 1, wherein the at least one vehicle accessory includes a first vehicle accessory and a second vehicle accessory, wherein the tensioner control system is further programmed to:
   control the tension in the endless drive member by preventing full operation of the first vehicle accessory and permit the operation of the second vehicle accessory when the tensioner control system determines that operation of the second vehicle accessory is needed and that full operation of the first vehicle accessory is not needed; and
   control the tension in the endless drive member by preventing full operation of the second vehicle accessory and permit the operation of the first vehicle accessory when the tensioner control system determines that operation of the first vehicle accessory is needed and that full operation of the second vehicle accessory is not needed.

5. A tensioning system as claimed in claim 4, wherein the tensioner control system is further programmed to:
   control the actuator force on the tensioner pulley to increase tension in the endless drive member when the tensioner control system determines that full operation of both the first vehicle accessory and the second vehicle accessory is needed.

6. A tensioning system as claimed in claim 1, wherein the tensioner includes:
   a pivot shaft that is fixedly mountable with respect to an engine block of an engine in the vehicle;
   a tensioner arm rotatably mounted to the pivot shaft for pivoting about a tensioner arm axis between the free arm stop position and the load stop position, wherein the pulley is rotatably mounted to the tensioner arm; and
   a tensioner spring positioned to exert a biasing force on the tensioner arm to bias the tensioner arm towards the free arm stop position, wherein the tensioner spring has a first end and a second end, wherein the first end is engaged with the tensioner arm.

7. A tensioning system as claimed in claim 6, wherein the tensioner actuator is operatively connected to control the position of the second end of the tensioner spring so as to control the biasing force exerted by the tensioner spring on the tensioner arm.

8. A tensioning system as claimed in claim 1, wherein the vehicle includes an engine control unit that is operatively connected to the at least one vehicle accessory, and wherein the tensioner control system is programmed to issue the commands for controlling the operation of the at least one vehicle accessory directly to the at least one vehicle accessory, and wherein operation of the at least one accessory under the control of the tensioner control system requires permission by the engine control unit.

9. A tensioning system for tensioning an endless drive member in a vehicle, comprising:
   a tensioner including a tensioner pulley that is movable between a free arm stop position and a load stop position, and further including a tensioner actuator operable to exert an actuator force on the tensioner pulley to drive the tensioner pulley towards the free arm position; and
   a tensioner control system operatively connected to the tensioner actuator to control the actuator force on the tensioner pulley, wherein the tensioner control system is configured to receive signals indicative of the state of at least one vehicle component aside from the tensioner, wherein the tensioner control system is programmed to:
   a) determine whether or not a load increase on the endless drive member is imminent, and
   b) control the actuator force based on the determination in step a) and substantially prior to the load increase,
   c) determine whether or not slip of the endless drive member is imminent, and
   d) control the actuator force based on the determination in step c),
   e) determine whether the ambient humidity is above a selected threshold;
   f) control the actuator force based on the determination in step e).

* * * * *